(12) United States Patent
Premysler

(10) Patent No.: US 8,339,716 B2
(45) Date of Patent: Dec. 25, 2012

(54) ILLUMINATION LENSES INCLUDING LIGHT REDISTRIBUTING SURFACES

(76) Inventor: Philip Premysler, Washington, DC (US)

(*) Notice: Subject to any disclaimer, the term of this patent is extended or adjusted under 35 U.S.C. 154(b) by 80 days.

(21) Appl. No.: 12/629,690

(22) Filed: Dec. 2, 2009

(65) Prior Publication Data

US 2010/0165637 A1    Jul. 1, 2010

Related U.S. Application Data

(60) Provisional application No. 61/200,732, filed on Dec. 3, 2008, provisional application No. 61/200,730, filed on Dec. 3, 2008.

(51) Int. Cl.
*G02B 3/02* (2006.01)
*G02B 17/00* (2006.01)
*F21V 5/04* (2006.01)
*F21V 7/04* (2006.01)

(52) U.S. Cl. ........ 359/728; 359/708; 359/718; 359/727; 359/800; 362/327; 362/335; 362/347

(58) Field of Classification Search .................. 359/718, 359/725, 800; 362/326
See application file for complete search history.

(56) References Cited

U.S. PATENT DOCUMENTS

| | | | | |
|---|---|---|---|---|
| 3,978,332 A | * | 8/1976 | Goytisolo Taltavull | 362/223 |
| 4,161,014 A | * | 7/1979 | Dey et al. | 362/263 |
| 4,161,015 A | * | 7/1979 | Dey et al. | 362/263 |
| 5,971,551 A | | 10/1999 | Winston | |
| 7,273,299 B2 | * | 9/2007 | Parkyn et al. | 362/244 |
| 7,731,395 B2 | * | 6/2010 | Parkyn et al. | 362/335 |
| 2003/0189832 A1 | | 10/2003 | Rizkin | |
| 2007/0058369 A1 | | 3/2007 | Parkyn | |
| 2010/0314985 A1 | * | 12/2010 | Premysler | 313/46 |

FOREIGN PATENT DOCUMENTS

| | | |
|---|---|---|
| WO | WO 2009091562 A2 * | 7/2009 |
| WO | WO 2010027345 A1 * | 3/2010 |

OTHER PUBLICATIONS

Web.<http://www.energystar.gov/ia/partners/prod_development/revisions/downloads/lighting/MathPath_Optics_(3)_OutdoorComments.pdf>.*

* cited by examiner

*Primary Examiner* — Ricky Mack
*Assistant Examiner* — Zachary Wilkes

(57) ABSTRACT

Illumination lenses (1806, 1902, 2002, 2100, 2200, 2300, 2400, 2500, 2600, 2700, 2800, 3006, 3100) having surfaces shaped according to given differential equations in order to distribute light in a highly controlled manner with minimum reflection losses are provided. Both primary lenses and secondary lenses are provided. The secondary lenses include outer surfaces that are defined as loci of constant optical distance from an origin at which a light source is located. Versions are provided of both the primary and secondary lenses having Total Internal Reflection (TIR) wings. These are useful in the case that narrower distributions of light are required. A method of refining the shape of the lenses to obtain more obtain lenses that produce better fidelity ideal light distributions is also provided.

15 Claims, 14 Drawing Sheets

*Prior Art*

*Prior Art*

*Prior Art*

*Prior Art*

*Prior Art*

2300

φ3 (degrees)

2400

TRANSMISSION (CALCULATED) 95.7%

QUASI LAMBERTIAN TO UNIFORM LENS PROFILE

Trans (calculated 95.6)

QUASI LAMBERTIAN TO COS^-3 PHI2_MAX=60

2700

2800

QUASI LAMBERTIAN TO COS^-3 PHI2_MAX=25
"Transmitted Percent 95.44317071 %"

2900

ILLUMINATION LENSES INCLUDING LIGHT REDISTRIBUTING SURFACES

RELATED APPLICATION DATA

This application is based on U.S. provisional application Nos. 61/200,730 and 61/200,732.

FIELD OF THE INVENTION

The present invention relates to illumination optics especially suitable for use with Light Emitting Diodes.

BACKGROUND OF THE INVENTION

Traditionally Light Emitting Diodes (LEDs) have primarily been used as indicator lamps in electronic equipment. However recently the power and efficacy (e.g., lumens per watt of electrical power) has been increasing and LEDs have been identified as a possible replacement for inefficient incandescent lamps in certain applications. The light emitting region of an LED is small (e.g., in the range of 2 mm to 0.5 mm across in many cases) which in theory opens up the possibility for highly controlled distribution of light. However many of LED optics developed so far do not produce controlled distributions, rather they typically produce Gaussian like distributions which is the hallmark of somewhat uncontrolled (random) light distribution, and is not ideal for most, if not all applications.

FIG. 1 is a graph including plots of light intensity versus polar angle for an ideal Lambertian (cosine) source 102, and a quasi-Lambertian white LED with a hemispherical primary lens 104. The intensity plot for the white LED is based on measurements taken at distance about 300 mm beyond the hemispherical primary lens surface. Note that the actual white LED distribution is close to the ideal Lambertian distribution. The Lambertian distribution is not particularly suited to any illumination tasks. Lens described herein below are able to redistribute light and produce more useful distributions. Note, as will be explained below, lenses taught herein can be adapted to LEDs, e.g., colored LEDs, that produce light distributions that depart more significantly from the Lambertian distribution shown in FIG. 1. This is because the lenses described herein below have shapes defined in terms of the light distribution of the LED (or other source) for which they are designed and the desired altered light distribution. It is noted that there is some uncertainty as to the exact angular distribution of light produced by a bare chip within its encapsulating primary lens, e.g., whether it might be closer to curve 102 or 104 however it is matter of minor consequence as the two distribution are sufficiently close that either might be used and the resulting distribution can be corrected with a few prototype iterations (as described below).

FIG. 2 shows a reflector 202 arranged to collect a portion of light emitted by an LED 204. A problem with using a reflector with an LED that emits over the entire hemisphere of solid angle is that the reflector needs to have an aperture and thus can not intercept and redirect all of the light. As shown in FIG. 1 light emitted within polar angle range from zero to ϕ passes through the aperture of the reflector 202 without redirection or control. Additionally for the reflector 202 to exert detailed control over the emitted light distribution it must be specular as opposed to diffuse, and polishing a reflector sufficiently to make it specular is often expensive.

In an attempt to address the problem posed by the hemispherical range of light output from LED, a type of "primary" optic 302 shown in FIG. 3 has been developed. (This is termed a "primary" optic because it is assumed that it may be used in conjunction with a "secondary" optic such as the reflector 202.) The term "primary optic" may also be taken to mean an optic which has an optical medium of index >1 extending from the LED die so that there only an outer optical surfaces. The primary optic 302 is designed to intercept light emitted by an LED chip which is positioned in a space 304 at the bottom of the primary optic 302 and to redirect the light radially outward, perpendicular to an optical axis 306. The primary optic includes a refracting part 308 and a TIR (Total Internal Reflection) part 310 both of which contribute to redirecting the light. One drawback of the primary optic 302 is that because it includes multiple optical surfaces that contribute to light in the same direction it will increase the effective size of the source (also the étendue), which reduces the controllability of light from the LED. The increased effective size of the source can in some cases be compensated for, by using larger secondary optics but this may be undesirable based on cost and space constraints. By way of loose analogy to imaging optics, the primary optic creates multiple "images" of the LED, e.g., one from the refracting part 308 and one from the TIR part 310.

Although, the primary optic 302 is intended to redirect light perpendicular to the optical axis, in practice light is redirected to a range of angles. This is because the primary optic is small and positioned in close proximity to the LED, and consequently the LED subtends a not-insignificant solid angle from each point of the primary optic, and light received within this finite solid angle is refracted or reflected into a commensurate solid angle. The result is shown in FIG. 4 which is a plot of light intensity vs. polar angle for an LED equipped with the primary optic 302. Although this distribution of light shown in FIG. 4 is not especially suited to any particular application, it is intended to direct light into an angular range that can be intercepted by a secondary optic e.g., reflector 202. The goal is not fully achieved in that the angular distribution of light produced by the primary optic 302 covers a range that extends from zero polar angle and therefore all of the light can not be intercepted by the reflector 202.

Another presently manufactured commercial optic 502 for LEDs is shown in FIG. 5. In use, an LED (not shown) will be located in a bottom recess 504. This optic 502 is one form of "secondary" optic. A LED with or without the primary optic 302 attached can be used. If used the primary optic will fit inside the bottom recess 504. The secondary optic 502 is made from optical grade acrylic (PMMA) and is completely transparent with no reflective coatings. The optic 502 includes a TIR (Total Internal Reflection) parabolic surface 506 which collects a first portion of light emitted by the LED, and a convex lens surface 508 which collects a remaining portion of the light. Both surfaces 506, 508 are intended to collimate light. As might be expected in actuality the light is distributed in a Gaussian like angular distribution over a certain angular range which is variously reported as 5 degrees and 10 degrees. The former value may be a FWHM value, and the actual value will vary depending on the exact LED that is used. This design is only useful for a fairly narrow range of specialized applications that require a far-field highly collimated LED spotlight. FIG. 6 shows an angular distribution of light produced by this type of optic. As shown the angular distribution is Gaussian-like not uniform.

In order to get a broader angular distribution of light some form of surface relief pattern can be added to a top surface 510 of the optic 502 which is planar as shown in FIG. 5. Alternatively, the surface relief pattern can be formed on a "tertiary" optic that is attached to the top surface 510. One type of surface relief pattern-concentric rings of convolutions is shown in a plan view in FIG. 7 and in a broken-out sectional elevation view in FIG. 8. Another type of surface relief pattern-an array of lenslets is shown in a plan view in FIG. 9 and in a broken-out sectional elevation view in FIG. 10. FIGS. 11 and 12 show light intensity distributions produced by commercial optics that have the same general design as shown in FIG. 5 but which have top surfaces with a surface relief pattern to broaden the angular distribution. The distribution shown in FIG. 11 is designated as having a 15 degree half-angle pattern and that shown in FIG. 12 a 25 degree half angle pattern.

Beyond the basic hemispherical primary lens other attempts have been made to obtain more useful distributions of light. FIG. 13 shows the profile of a primary lens designed by adding a spline perturbation to the basic hemispherical shape and optimizing the parameters of the spline perturbation using an optimization routine. One drawback of this lens is that it includes fine scale features that may be difficult to replicate in silicone which is often used to make LED primary lenses. Another drawback is that intensity distribution is sensitive to minute variations in the position of the LED die under the lens. FIG. 14 shows the irradiance pattern produced by the lens shown in FIG. 13 in two different planes. Another drawback of this lens is that the distribution is somewhat jagged. The jaggedness, which may arise due to the fine scale spline perturbation is not ideal.

The lens shown in FIG. 13 is representative of one approach to illumination optics which has been used with varying success during the last two decades-namely paramaterizing an optical surface in someway and using an optimization routine to vary the parameters while checking an objective function that depends on the pattern of light produced by the lens. Such optimization is generally considered a method of last resort, when a problem appears to be intractable.

FIG. 15 is a sketch of the profile of a "batwing" primary lens 1500 available on Luxeon™ LEDS made by Lumileds of San Jose, Calif. Batwing distributions, which predate the interest in using LEDs for lighting and were achieved by some fluorescent light fixtures for example, are characterized by increasing radiant intensity as a function of polar angle. The batwing primary lens shown in FIG. 15 appears to consist of a conical side wall 1502 joined to a relatively low curvature top surface 1504 by a radiused edge 1506. Arguably, the ideal batwing distribution is the theoretically known $\cos^{-3}(\phi)$ distribution, where $\phi$ is the polar angle. This distribution is ideal in the sense that it will illuminate a plane surface uniformly. FIG. 16 shows the actual distribution of light produced by the lens 300 (represented by measured data points) along with a plot of $\cos^{-3}(\phi)$. The actual distribution produced by the lens 1500 departs markedly from the $\cos^{-3}(\phi)$ distribution. Roughly speaking, the region around the radiused edge 306 creates a sort of positive lens which concentrates light in the direction of about 40 degrees so that the actual distribution exceeds the $\cos^{-3}(\phi)$ from about 20 to about 40 degrees and the sidewall 1504 allows a significant amount of light to form a tailing off of intensity up to about 70 degrees.

FIG. 17 shows another type of optic 1700 that is useful for illumination. This optic includes a saw tooth TIR section 1702 and a central lens portion 1704. The optic 1700 can collect a full hemisphere of emission from a source and forms an illumination pattern with a half-angle divergence (polar angle) about 30 degrees. This lens is disclosed in U.S. Pat. No. 5,577,492. For this type of optic there will be some loss of light from the intended distribution at the corners of the saw tooth pattern, which in practice may not be perfectly sharp due to manufacturing limitations. Additionally, due to its complex shape the cost of machining and polishing molds for injection molding is expected to be high. Additionally the '492 patent does address controlling the distribution of light within angular limits of the beams formed. The optic 1700 is already broad relative to its height. If an attempt were made to broaden the polar angle range of the illumination pattern, the TIR surfaces 1704 would have to be angled at larger angles, making the optic even broader-perhaps impractically broad.

BRIEF DESCRIPTION OF THE FIGURES

The present invention will be described by way of exemplary embodiments, but not limitations, illustrated in the accompanying drawings in which like references denote similar elements, and in which.

DETAILED DESCRIPTION

Figure 18:
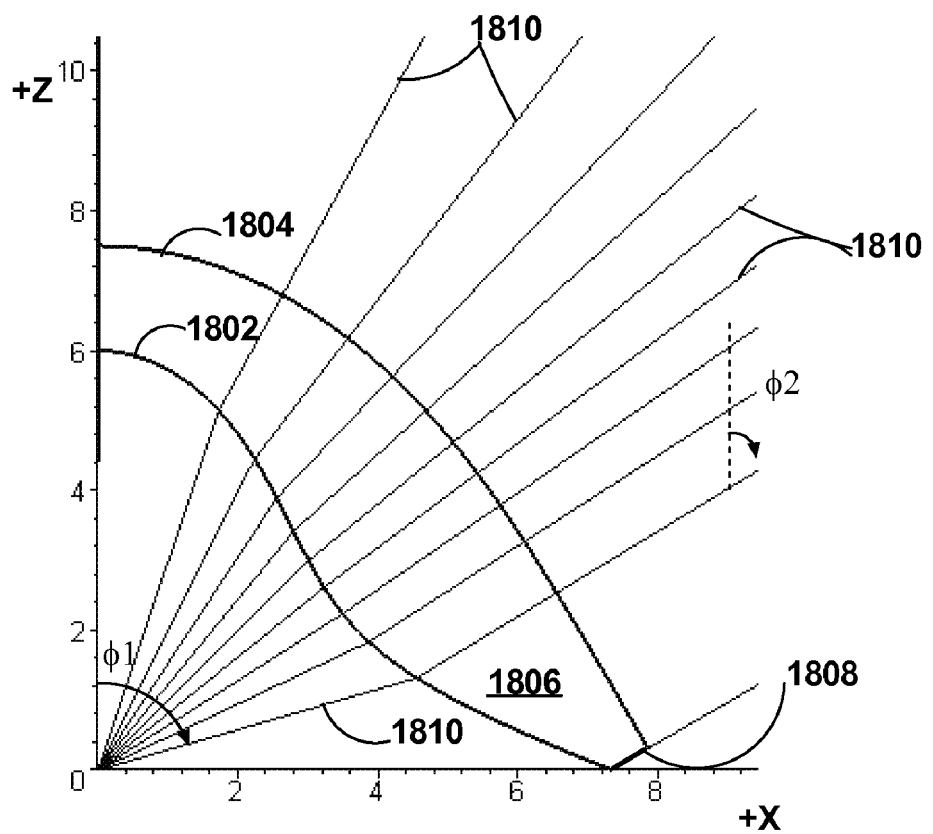
FIG. 18-20 are graphs including an X-Z coordinates systems of generatrices of secondary lenses that include refracting surfaces that distribute light in a controlled manner and produce beams of half angle 60, 55 and 65 respectively.

FIG. 18 is a plot of half-profiles (generatrices) of a first surface 1802 and a second surface 1804 of a lens 1806 according to an embodiment of the invention. The plots are shown in a coordinate system that includes an X-axis and a Z-axis. The surfaces 1802, 1804 are surfaces of revolution about the Z-axis (optical axis). The surfaces 1802, 1804 are joined by an annular edge surface 1808. The surfaces 1802, 1804 bound a body of transparent material, e.g., glass, plastic, silicone of which the lens 1806 is made. The origin of the coordinate system corresponds to the location of the light source (e.g., an LED). By loose analogy to imaging optics, the origin of the X-Z coordinate system can be considered the one and only focus of the lens 1806. A set of rays 1810 are shown emitted from the origin and refracted by the lens surfaces 1802, 1804. Two angles phi1, phi2 which will be described below are shown.

According to embodiments of the invention illumination lenses have a first surface 1802 shaped according to the following coupled differential equations:

DE1
$$\frac{\partial}{\partial \phi 1} r1(\phi 1) = -\frac{r1 n2 \sin(\phi 2 - \phi 1)}{n2 \cos(\phi 2 - \phi 1) - n1}$$

Where:

n2 is the index of refraction of the lens defined by the equations;

n1 is the index of refraction of the surrounding medium (e.g., of air) which usually equals 1;

phi1 is the polar angular coordinate (zenith angle) of the first lens surface;

phi2 is the polar angle (zenith angle) of an ideal ray (a ray emitted at the origin) that was initially emitted at angle phi1 after the ray been refracted by the first lens surface of each lens defined by the equations and is given by:

$$\frac{\int_{\phi 1\_MIN}^{\phi 1} rad\_in(\phi 1) \cdot 2\pi \cdot \sin(\phi 1) d\phi 1}{\int_{\phi 1\_MIN}^{\phi 1\_MAX} rad\_in(\phi 1) \cdot 2\pi \cdot \sin(\phi 1) d\phi 1} = \frac{\int_{\phi 2\_MIN}^{\phi 2} rad\_out(\phi 2) \cdot 2\pi \cdot \sin(\phi 2) d\phi 3}{\int_{\phi 2\_MIN}^{\phi 2\_MAX} rad\_out(\phi 2) \cdot 2\pi \cdot \sin(\phi 2) d\phi 3}$$  EQU. 1 where, phi1_MIN and phi1_MAX are the lower and upper limits polar angle limits respectively of light collected by each lens defined by the equation;

phi2_MIN and phi2_MAX are the lower and upper limits respectively of a predetermined specified output light intensity distribution function for each lens defined by the equation;

rad_in(phi1) is the light intensity distribution of the light source (e.g., LED) for which the lens is designed; and rad_out(phi2) is the predetermined specified output light intensity distribution for each lens defined by the equations; with initial condition r1_ini.

According to embodiments of the invention illumination lenses have a the second surface 1804 defined as a locus of points at equal "optical distance" from the origin of the X-Z coordinate system. Optical distance is the geometric distance weighted by the local index of refraction. Thus between the origin and the first surface 1802 the "optical distance" is merely equal to the actual distance, and between the first surface 1802 and the second surface 1804 the "optical distance" is equal to the actual distance multiplied by n2. Beyond the first surface the optical distance is measured along the refracted ray direction. The refracted ray direction is phi2. With its shape defined in this way, the second surface 1804 does not deflect ideal light rays that pass through it.

EQU. 1 is solved numerically to obtain a value of phi2 for each input value of phi1 and DE1 and is integrated numerically, e.g., using the Runge Kutta integrator.

For each of several examples discussed herein a table of inputs to the lens equations is given. The table for the lens represented in FIG. 18 is:

TABLE I

| | |
|---|---|
| Phi1_MIN | 0.0 radians |
| Phi1_MAX | 1.57 radians (90 degrees) |
| Phi2_MIN | 0.0 radians |
| Phi2_MAX | 1.047 radians (60 degrees) |
| rad_in(phi1) | Plot 104 Quasi Lambertian |
| rad_out(phi2) | cos(phi2)^(−3.0) (goal is uniformity on plane) |
| r1_ini | 6.0 |
| r2_ini | 7.5 |
| n1 | 1.0 |
| n2 | 1.497 (PMMA) |
| Phi_start | Phi1_min |
| Calculated Transmission | 85% |

Note that although the initial conditions and dimensions shown in the FIGs. can be considered to be in arbitrary units (meaning that scaling is possible), the values were selected with millimeter units in mind. Phi start is the initial value of phi, i.e., the value of phi at which r1_ini and r2_ini are given. R2_ini given in the table is the Z-coordinate of the second lens surface along the Z-axis. In this case the "optical distance" is equal to r1_ini+(r2_ini−r1_ini)*n2.

The second to last row in the tables determines the Phi1 value at which the initial conditions r1_ini and r2_ini are defined. The choice of r1_ini and r2_ini is not critical. The difference between r1_ini and r2_ini should be chosen to give a designed initial lens thickness. Alternatively, r2_can be adjusted to give a certain lens diameter. One caveat is that if r1_ini and r2_ini are chosen too close the profiles given by the lens equations may cross-over which is physically excluded. The solution to this problem is to choose r1_ini and r2_ini further apart and reevaluate. Also, a smaller difference between r1_ini and r2_ini will lead to a faster mold cooling time and therefore increased manufacturing productivity. Furthermore r1_ini must be large enough to accommodate the LED.

The lens shown in FIG. 18 collects light energy from a full hemisphere of solid angle from an LED and distributes the light relatively uniformly on an area of a plane (e.g., floor, ceiling or wall). Additionally, the light is substantially confined to a cone of polar angle (zenith angle) 60 degrees. This is a good polar angle limit for certain applications such as low-bay lighting or up-lighting. Of course, uniform illumination of an area of a plane can not be obtained without limits on phi3_max because as phi3_max approaches Pi/2 the light energy requirement for any finite illumination level goes to infinity.

In FIG. 18 a series of design rays 1810 are shown emanating from the origin and traced through the lens 1806. (Only a two are connected to lead lines so as not to crowd the drawings). One ray which is not visible is along the +Z axis. Another ray which is initially not visible is emitted along the +X axis and is then refracted at an angle by the lens. These are all ideal rays emanating from the origin of the X-Z coordinate system. The initial angles of these rays are not arbitrary, rather the angles are selected to divide the light energy emitted by the light source (e.g., LED) into equal energy portions. Doing so helps to visualize how the lens redistributes energy.

Figure 19:
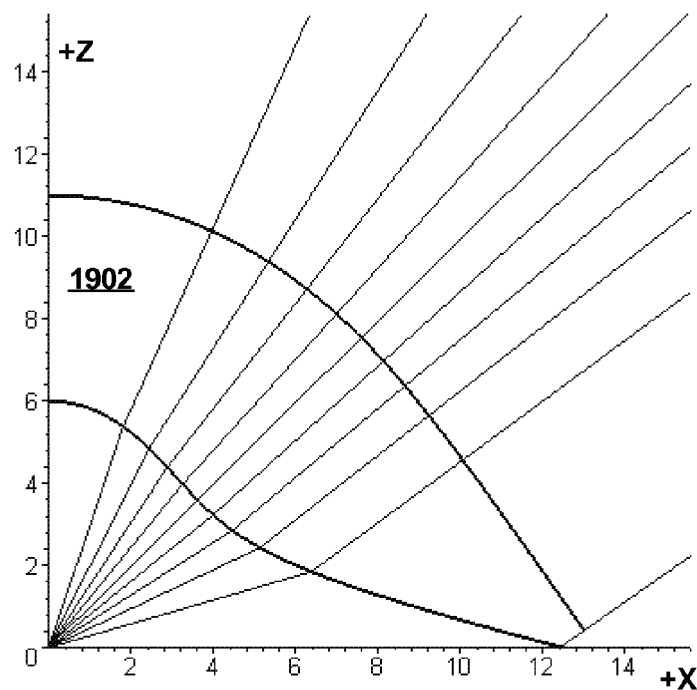

FIG. 19 shows generatrixes of a lens that produces a slightly reduced angular spread compared to the lens shown in FIG. 18. Table II below list information for the lens shown in FIG. 19.

TABLE II

| | |
|---|---|
| Phi1_MIN | 0.0 radians |
| Phi1_MAX | 1.57 radians (90 degrees) |
| Phi2_MIN | 0.0 radians |
| Phi2_MAX | 0.960 radians (55 degrees) |
| rad_in(phi1) | Plot 104 Quasi Lambertian |
| rad_out(phi2) | cos(phi2)^(−3.0) |
| | (goal is uniformity on plane) |
| r1_ini | 6.0 |
| r2_ini | 11.0 |
| n1 | 1.0 |
| n2 | 1.497 (PMMA) |
| Phi_start | Phi1_min |
| Calculated Transmission | 85% |

Figure 20:
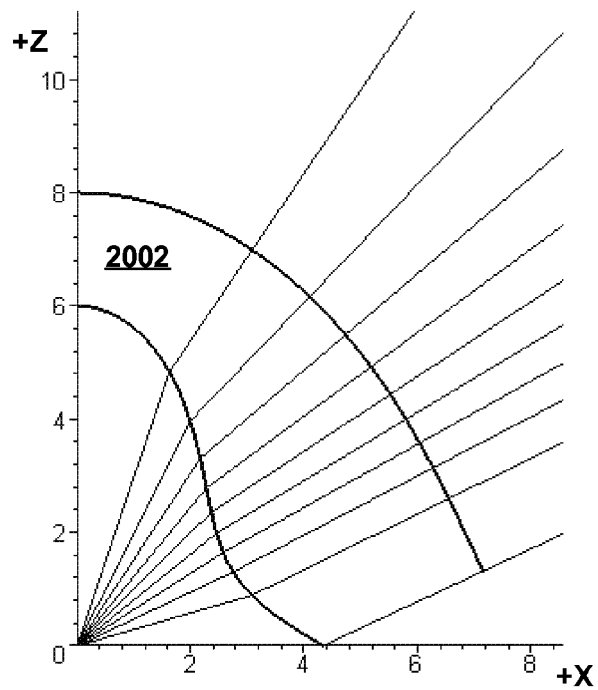

FIG. 20 shows generatrixes of a lens 2002 that produces a slightly wider angular spread than the lens shown depicted in FIG. 18. Table III below list information for the lens shown in FIG. 20.

TABLE III

| | |
|---|---|
| Phi1_MIN | 0.0 radians |
| Phi1_MAX | 1.57 radians (90 degrees) |
| Phi2_MIN | 0.0 radians |
| Phi2_MAX | 1.134 radians (65 degrees) |
| rad_in(phi1) | Plot 104 Quasi Lambertian |
| rad_out(phi2) | cos(phi2)^(−3.0) |
| | (goal is uniformity on plane) |
| r1_ini | 6.0 |
| r2_ini | 8.0 |
| n1 | 1.0 |
| n2 | 1.497 (PMMA) |
| Phi_start | Phi1_min |
| Calculated Transmission | 85% |

Figure 21:
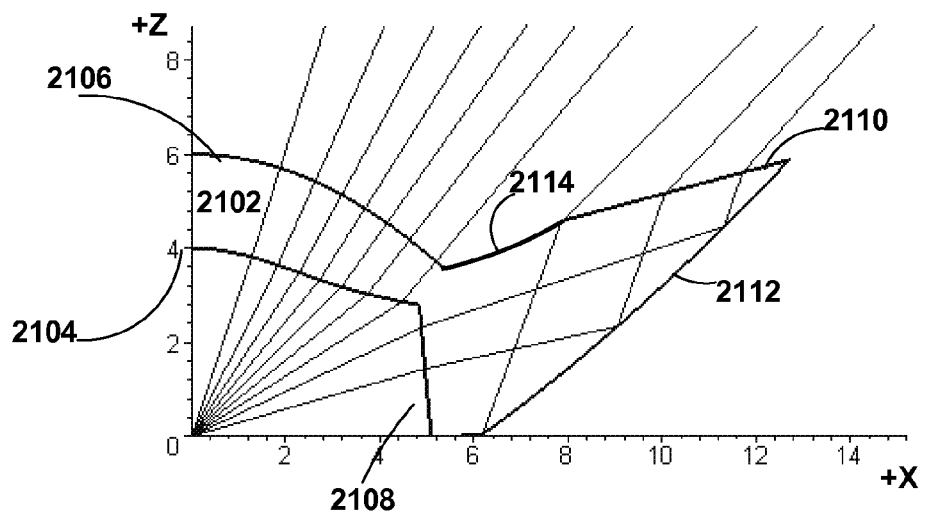
FIGS. 21-24 are graphs including the X-Z coordinate system and generatrices of secondary lenses that have a central refracting portion and outer Total Internal Reflecting wings that together distribute light in a controlled manner and produce beams of half angles of about 45, 35, 25 and 15 degrees respectively.

As the light ray deflection angles increase beyond a certain point the transmission of the lens drops off precipitously. For certain lighting tasks a narrow distribution of light is desirable. If a high collection efficiency is to be maintained by keeping phi1_max at 90 degrees then a higher deflection angle is needed in order to produce a narrower distribution of light. FIG. 21 shows generatrices of a lens 2100 that includes a central portion 2102 that has a first surface 2104 defined by DE1 and a second surface 2106 defined as locus of points of constant optical distance from the origin and also has a conical surface 2108, an exit surface 2110 and a Total Internal Reflection (TIR) surface 2112 given by DE2 below. The TIR surface 2112 defined by DE2 works in concert with the central portion 2102 to continue the overall light intensity distribution specified by rad_out. A joining surface 2114 extends between the second surface 2106 and the exit surface 2110.

DE2

$$\frac{\partial}{\partial \phi 1} r2\_w = -r2\_w(\phi 1)\tan\left(\frac{1}{4}\pi - \frac{1}{2}\text{phi\_draft} + \frac{1}{2}\arcsin\left(\frac{n1\%2}{n2}\right) - \frac{1}{2}\arcsin\left(\frac{n1\sin(\text{phi\_exit} - \phi 3)}{n2}\right) + \frac{1}{2}\text{phi\_exit} + \arcsin\left(\frac{r1\_\text{switch}\ \%4\cos(\%3)}{\%1r2\_w(\phi 1)}\right)\right)$$

$$\left(-\frac{n1\sin(-\phi 1 + \text{phi\_draft})}{n2\sqrt{1 - \frac{n1^2\%2^2}{n2^2}}} - \frac{(-\tan(\text{phi\_draft})\sin(\phi 1) - \cos(\phi 1))}{(\%1^2 r2\_w(\phi 1))} - \frac{r1\_\text{switch}\ \%4\cos(\%3)}{(\%1^2 r2\_w(\phi 1))}\right.$$

$$\left.\left(r1\_\text{switch}\ \%4\sin(\%3)\left(1 + \frac{n1\sin(-\phi 1 + \text{phi\_draft})}{n2\sqrt{1 - \frac{n1^2\%2^2}{n2^2}}}\right)\right) \middle/ \%1r2\_w(\phi 1)\right)$$

$$\sqrt{1 - \frac{r1\_\text{switch}^2\ \%4^2\cos(\%3)^2}{\%1^2 r2\_w(\phi 1)^2}}\bigg/$$

$$\left(1 + \tan\left(\frac{1}{4}\pi - \frac{1}{2}\text{phi\_draft} + \frac{1}{2}\arcsin\left(\frac{n1\%2}{n2}\right) - \frac{1}{2}\arcsin\left(\frac{n1\sin(\text{phi\_exit} - \phi 3)}{n2}\right) + \frac{1}{2}\text{phi\_exit} + \arcsin\left(\frac{r1\_\text{switch}\ \%4\cos(\%3)}{\%1r2\_w(\phi 1)}\right)\right)r1\_\text{switch}$$

$$\%4\cos(\%3)\bigg/\left(r2\_w(\phi 1)\ \%1\sqrt{1 - \frac{r1\_\text{switch}^2\%4^2\cos(\%3)^2}{\%1^2 r2\_w(\phi 1)^2}}\right)$$

$\%1 := \tan(\text{phi\_draft})\cos(\phi 1) - \sin(\phi 1)$
$\%2 := \cos(-\phi 1 + \text{phi\_draft})$
$\%3 := \phi 1 - \text{phi\_draft} + \arcsin\left(\frac{n1\%2}{n2}\right)$
$\%4 := \tan(\text{phi\_draft})\cos(\text{phi1\_switch}) - \sin(\text{phi1\_switch})$ Where, n1, n2, phi1 are as defined above;
Phi3 is equal to phi2 given by EQU. 1
r2_w is the polar radial coordinate of the TIR surface 2112;
r1_switch is the polar radial coordinate of the top of the conical surface 2108 (also in the case of FIG. 21 the point at which the conical surface 2108 meets the first surface 2104 defined by DE1.)
phi1_switch is the polar angular coordinate of the top of the conical surface 2108;
phi_draft is the angle of the conical surface 2108 measured in the clockwise direction from the positive Z-axis;

phi_exit is the angle of the surface normal of the exit surface 2110 measured in the clockwise direction from the positive Z-axis,
with initial condition r2_w_ini.
The polar angular coordinate (zenith angle) of the TIR surface 2112 is given by the following equation.

$$phi2w = \frac{1}{2}\pi + \text{phi\_draft} - \arcsin\left(\frac{n1\cos(-\phi1 + \text{phi\_draft})}{n2}\right) - \arcsin\left(r1\_switch\left(\tan(\text{phi\_draft})\cos(\text{phi1\_switch}) - \sin(\text{phi1\_switch})\right)\cos\left(\phi1 - \text{phi\_draft} + \arcsin\left(\frac{n1\cos(-\phi1 + \text{phi\_draft})}{n2}\right)\right)\right) / \left((\tan(\text{phi\_draft})\cos(\phi1) - \sin(\phi1))r2\_w(\phi1)\right)$$

EQU. 2 r1_w and phi2w together define the TIR surface 2112 in polar coordinates. Cartesian coordinates can be obtained from them.

In embodiments such as shown in FIG. 21 phi_draft has a small negative value to allow the lens 2100 to release from a mold. A more negative phi_draft will tend to increase the size of the TIR surface 2112. On the other hand a more negative value of phi_exit tends to reduce the size of the TIR surface. Both phi_draft and phi_exit should be selected (using phi1_max, phi1_switch and phi3_max as points of reference) to avoid large angles of incidence that would reduce light transmission. Note that the exit surface 2110 can be raised slightly from the top edge of the TIR surface 2112 in order to provide a peripheral location for an injection molding gate. The portion of the lens 2100 between the conical surface 2108, the exit surface 2110 and the TIR surface 2112 is referred to herein as the "TIR wings". Table IV below lists information for the lens shown in FIG. 21.

TABLE IV

| | |
|---|---|
| Phi1_MIN | 0.0 radians |
| Phi1_MAX | 1.57 radians (90 degrees) |
| Phi2_MIN | 0.0 radians |
| Phi2_MAX | 0.785 radians (45 degrees) |
| Phi_draft | 0.087 radians (−5.0 degrees) |
| Phi_exit | −0.262 radians (−15.0 degrees) |
| Phi1_switch | 1.047 radians (60.0 degrees) |
| rad_in(phi1) | Plot 104 Quasi Lambertian |
| rad_out(phi2) | $\cos(phi2)^{\wedge}(-3)$ (uniform on plane goal) |
| r1_ini | 4.0 |
| r2_ini | 6.0 |
| r2_w_ini | 14.0 |
| n1 | 1.0 |
| n2 | 1.497 (PMMA) |
| Phi_start | Phi1_min for DE1 Phi1_switch for DE2 |
| Calculated Transmission | 90.5% |

Figure 22:
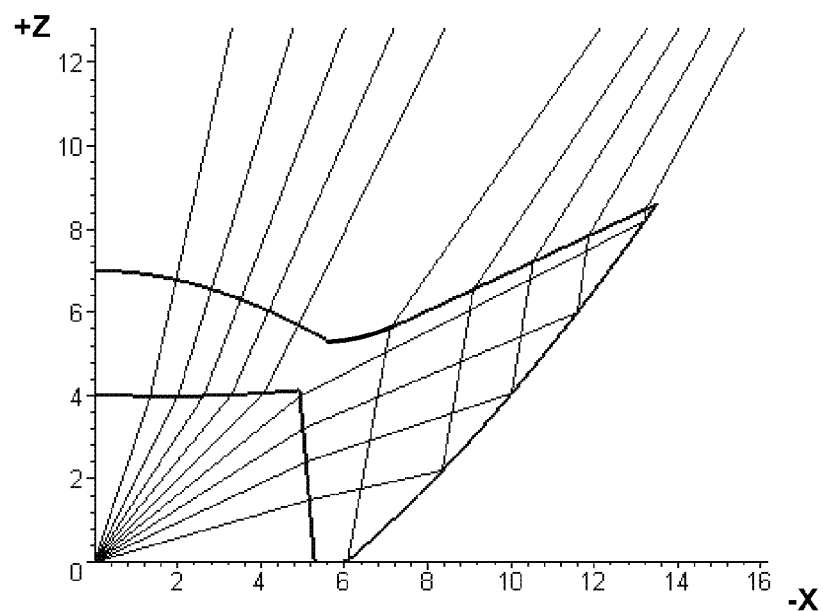

FIG. 22 shows another lens 2200 that is similar to that shown in FIG. 21 but which produces a narrower distribution of light, i.e. with phi2_max equal 35 degrees. Table V below gives information for the lens shown in FIG. 22.

TABLE V

| | |
|---|---|
| Phi1_MIN | 0.0 radians |
| Phi1_MAX | 1.57 radians (90 degrees) |
| Phi2_MIN | 0.0 radians |
| Phi2_MAX | 0.611 radians (35 degrees) |
| Phi_draft | 0.087 radians (−5.0 degrees) |
| Phi_exit | −0.436 radians (−25.0 degrees) |
| Phi1_switch | 0.872 radians (50.0 degrees) |
| rad_in(phi1) | Plot 104 Quasi Lambertian |
| rad_out(phi2) | $\cos(phi2)^{\wedge}(-3)$ (uniform on plane goal) |
| r1_ini | 4.0 |
| r2_ini | 7.0 |
| r2_w_ini | 16.0 |
| n1 | 1.0 |
| n2 | 1.497 (PMMA) |
| Phi_start | Phi1_min for DE1 Phi1_switch for DE2 |
| Calculated Transmission | 89.9% |

Figure 23:
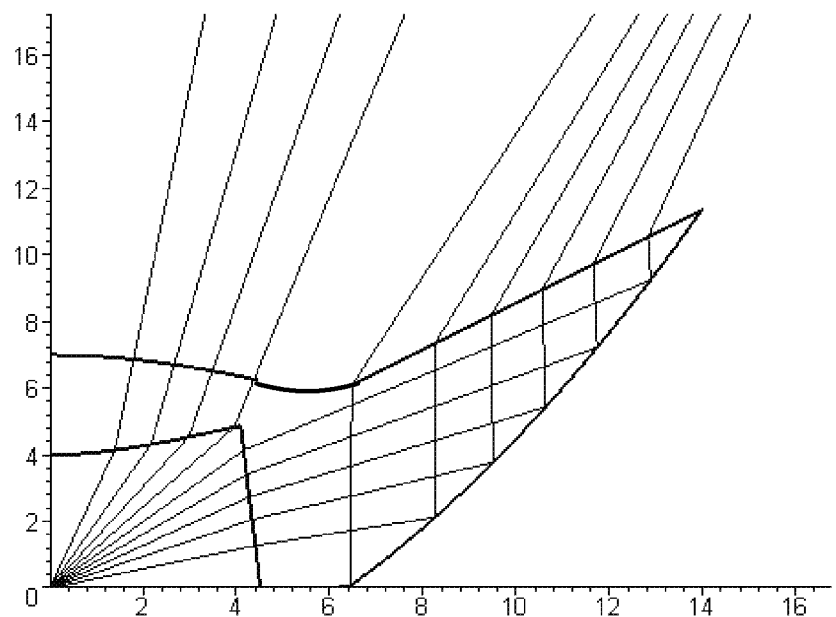

FIG. 23 shows another lens 2300 that is similar to that shown in FIG. 21 but which produces an even narrower distribution of light, i.e. with phi2_max equal 25 degrees. Table VI below gives information for the lens shown in FIG. 23.

TABLE VI

| | |
|---|---|
| Phi1_MIN | 0.0 radians |
| Phi1_MAX | 1.57 radians (90 degrees) |
| Phi2_MIN | 0.0 radians |
| Phi2_MAX | 0.436 radians (25 degrees) |
| Phi_draft | 0.087 radians (−5.0 degrees) |
| Phi_exit | −0.611 radians (−35.0 degrees) |
| Phi1_switch | 0.872 radians (40.0 degrees) |
| rad_in(phi1) | Plot 104 Quasi Lambertian |
| rad_out(phi2) | $\cos(phi2)^{\wedge}(-3)$ (uniform on plane goal) |
| r1_ini | 4.0 |
| r2_ini | 7.0 |
| r2_w_ini | 18.0 |
| n1 | 1.0 |
| n2 | 1.497 (PMMA) |
| Phi_start | Phi1_min for DE1 Phi1_switch for DE2 |
| Calculated Transmission | 89.2% |

Figure 24:
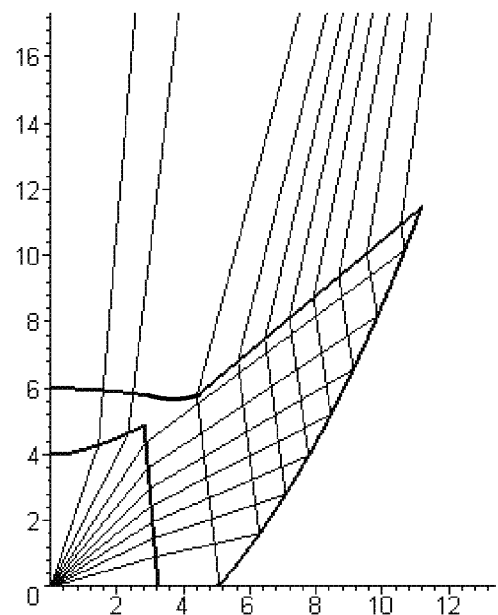

FIG. 24 shows another lens 2400 that is similar to that shown in FIG. 21 but which produces a still narrower distribution of light, i.e. with phi2_max equal 15 degrees. Table VII below gives information for the lens shown in FIG. 24.

TABLE VII

| | |
|---|---|
| Phi1_MIN | 0.0 radians |
| Phi1_MAX | 1.57 radians (90 degrees) |
| Phi2_MIN | 0.0 radians |
| Phi2_MAX | 0.262 radians (15 degrees) |
| Phi_draft | 0.087 radians (−5.0 degrees) |
| Phi_exit | −0.698 radians (−40.0 degrees) |
| Phi1_switch | 0.523 radians (30.0 degrees) |
| rad_in(phi1) | Plot 104 Quasi Lambertian |
| rad_out(phi2) | $\cos(phi2)^{\wedge}(-3)$ (uniform on plane goal) |
| r1_ini | 4.0 |
| r2_ini | 6.0 |
| r2_w_ini | 16.0 |
| n1 | 1.0 |
| n2 | 1.497 (PMMA) |
| Phi_start | Phi1_min for DE1 Phi1_switch for DE2 |
| Calculated Transmission | 89.8% |

Whereas the TIR wings shown in FIG. 21 are useful in confining light to smaller angular range around the Z axis, the TIR wings defined by DE2 can also be located at the top of the lens and used to confine light to a small angular range near phi3=π/2 (near the "equator" of a the spherical coordinate system). In order to use the differential equations given above to define a lens having TIR wings at the top the differential equations are integrated to the left of the Z-axis, i.e., with negative values of the phi variables. Note rad_out and rad_in are generally assumed to be symmetric so using negative phi values does not change these light distributions.

Lenses defined as described above are able to collect a full hemisphere of light emitted by an LED, and are able to distribute the light in a controlled manner. At the same time surfaces of the lens defined by these equations are shaped to control transmittance losses. The examples described while providing a wide variety of light distributions hardly loose any more light by reflection than would an optical window at normal incidence. The calculated transmittances for the lens examples described herein are not much lower than the transmittance for light passing perpendicularly through an optical window. As illustrated above, for many practical general illumination lenses defined by the differential equations given above the calculated transmittance is over 85% and some over 88%. A transmittance of 85% represents a better than usual optical luminaire efficiency. The optical luminaire efficiency is defined as the percentage of light emitted by a light source (e.g., LED) that is output by an associated luminaire which in the present case includes the lenses defined by the above differential equations.

There is another efficiency factor that is termed herein "pattern efficiency" and is related to the percentage of light energy in an output distribution of light that is in excess of a required light intensity. Because the light distribution patterns produced by most luminaries (e.g., flood lamps, down lights) is stronger in a central part of an angular or spatial range that is intended to be illuminated, the total power of the luminaire must be higher than it would have to be if the pattern of illumination covered the angular or spatial range uniformly. Because the predetermined light output distribution rad_out (phi3) can be freely chosen, lenses described herein can produce light intensity distributions that avoid wastefully excessive central intensities. If a uniform light intensity distribution as a function of phi3 is needed then rad_out(phi3) is set equal to one in the above equations. If a flat area such as the floor of a room, desk or counter surface, is to be illuminated uniformly without wasteful excessive central intensity then rad_ut(phi3) can be set to:

$$\text{rad\_out}(\phi 3) = \frac{1}{(\cos(\phi 3))^e} \quad \text{EQU. 3}$$

where e is approximately equal to 3, e.g., 3.2, 3.3, 3.9.

Figure 16:
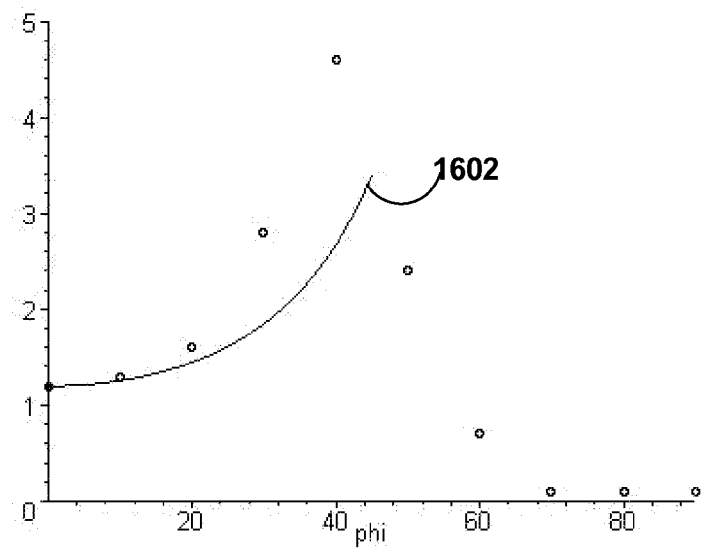
FIG. 16 plot of light intensity versus polar angle produced by the primary optic shown in FIG. 3.
Figure 17:
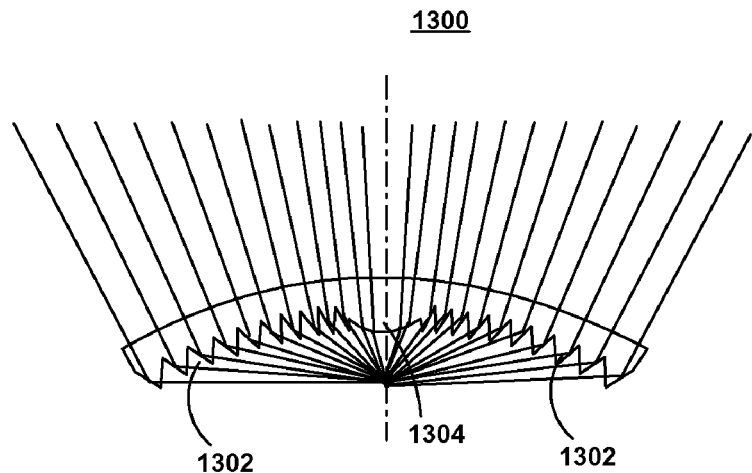
FIG. 17 is an illumination lens that includes a saw tooth TIR section in addition to a central lens portion.

This distribution with e=3.0 is a theoretically known distribution and is shown as a plotted line 1602 in FIG. 16 for a phi3 range from zero to 45. (In FIG. 16 the distribution has been scaled so that the on-axis intensity matches the accompanying data.) This distribution is quiet the opposite of the usual luminaire distribution which is peaked in the center. This distribution is low in the center and increases as the polar angle phi3 increases. The increase is about a factor of 2.8 at 45 degrees. More light is required at high values of phi3, because there is more area per phi3 increment as phi3 increases. Examples of lenses defined using the intensity distribution specified by EQU. 3 are shown in FIGS. 18-24,26,28,29. Experience with similar lenses described in co-pending international patent application PCT/US2008/010359 has shown that higher fidelity to EQU. 3 with e=3 may, in some case, be achieved if e in EQU. 3 is set to a slightly higher value e.g., 3.2, 3.3, 3.9. This is believed to be due to the fact that the finite size of the LED die causes a blurring effect (akin to an angular analog of a point spread effect) which leads to lesser variation than intended. This is compensated by increasing e in rad_out of the form given by EQU. 3. The amount that e should be increased can be determined by making a few prototype lenses using different values of e. For example one can start with a value of e=3 which will probably produce an actual rad_out distribution that is too weak a function, then one can try 3.5 and depending on whether the variation of the resulting distribution function is too strong or too weak one can then use a lower or higher value of e. In working with similar lenses, the inventor has found that a few prototypes are sufficient to achieve acceptable fidelity to the intended distribution.

If it is desired to avoid a sharp shadow at the edge of the illuminated area rad_out(phi3 given by EQU. 3 can be multiplied by a function that is constant over a substantial portion of the phi2 range, say up to 0.8 times phi2_max, and then tapers down gradually (e.g., linearly). In some cases edge effects that occur at phi2_max even without altering rad_out (phi2) may provide sufficient tapering of the light pattern edge.

In practice there may be as much to be gained in terms of pattern efficiency by using lenses according to the present invention as there is to be gained in terms of optical luminaire efficiency (i.e., the percentage of light generated in the luminaire that escapes the luminaire).

Additionally the lenses defined by the lens equations given above have smooth surfaces with a limited number of corners which means that the issue of light loss at numerous corners is avoided. Additionally having smooth surfaces with a limited number of corners, means that the molds to make the lenses and consequently the lenses themselves can be made more economically.

According to embodiments described above EQU. 1 specifies a monotonic increasing relation between phi2 and phi1, i.e., as phi1 increases so does phi2. According to alternative embodiments of the invention rather than using EQU. 1 the following alternative is used:

$$\frac{\int_{\phi 1\_MIN}^{\phi 1} \text{rad\_in}(\phi 1) \cdot 2\pi \cdot \sin(\phi 1) \, d\phi 1}{\int_{\phi 1\_MIN}^{\phi 1\_MAX} \text{rad\_in}(\phi 1) \cdot 2\pi \cdot \sin(\phi 1) \, d\phi 1} = \frac{\int_{\phi 2}^{\phi 2\_MAX} \text{rad\_out}(\phi 2) \cdot 2\pi \cdot \sin(\phi 2) \, d\phi 2}{\int_{\phi 2\_MIN}^{\phi 2\_MAX} \text{rad\_out}(\phi 2) \cdot 2\pi \cdot \sin(\phi 2) \, d\phi 2} \quad \text{EQU. 4}$$

According to this alternative phi2 is a decreasing function of phi1. This alternative is generally not as good because it leads to higher average ray deflections (phi2−phi1) and thus more surface reflection losses. One possible use is in a lens that includes two or more portions including at least one defined using EQU. 1 and at least one defined using EQU. 4. For example a first portion of lens which covers a phi1 range from zero to an intermediate value of phi1 which bisects the light intensity output of the light source into two equal portions can be defined using EQU. 4 and a second portion of lens which covers a remaining phi1 range can be defined using EQU. 1. For both portions phi2_min can be set to zero and phi2_max to 45 degrees. Within both portions in the limit that phi1 approaches the intermediate value of phi1, the output ray angle phi2 will approach zero. Thus, the junctures between the surfaces at the intermediate angle can be continuous and smooth.

Figure 25:
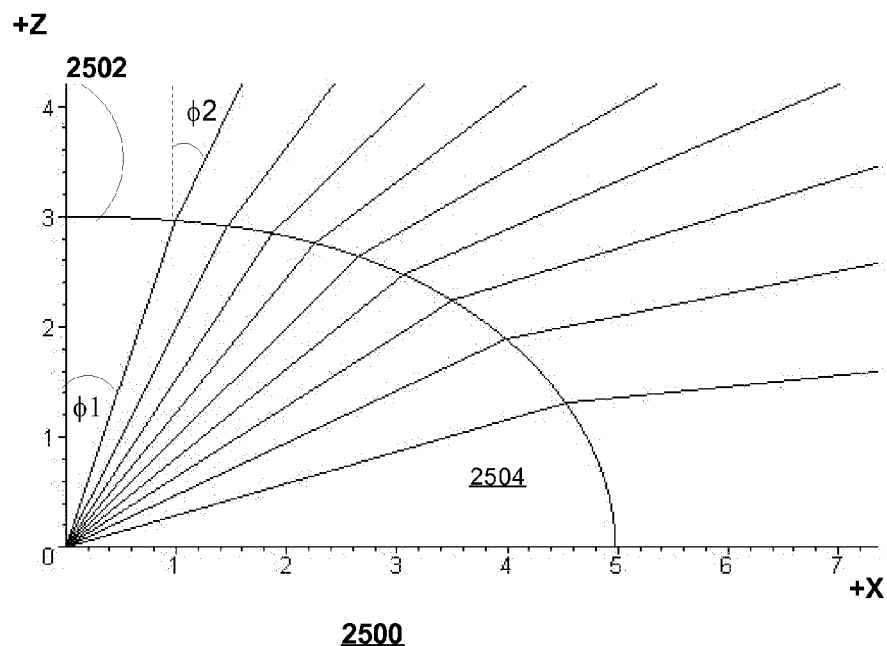
FIGS. 25-26 are graphs including the X-Z coordinate system and generatrices of refractive primary lenses for producing various light distributions.

FIG. 25 is a plot of a generatrix of a surface 2502 of a primary lens 2504 according to an embodiment of the invention. The plot is shown in a coordinate system that includes an X-axis and Z-axis. The surface 2502 is a surface of revolution about the Z-axis. The surface bounds a body of transparent material, e.g., silicone or epoxy. The origin of the coordinate system corresponds to the location of the light source (e.g., an LED). By loose analogy to imaging optics, the origin of the X-Z coordinate system can be considered the one and only focus of the lens 2504. Two angles phi1, phi2 which are referred to below are shown for a first of 9 design rays shown in FIG. 25. The coordinates in FIG. 25 and other lens generatrix plots shown below are in arbitrary units, but were selected with millimeters in mind.

According to embodiments of the invention primary lenses for LEDs have a surfaces (e.g., 2502) shaped according to the following differential equation:

DE3
$$\frac{\partial}{\partial \phi 1} r1 = \frac{r1 n2 \sin(\phi 2 - \phi 1)}{-n2 \cos(\phi 2 - \phi 1) - n1}$$

Where, r1 is a radial coordinate of the lens surface;

phi1 is a polar (zenith) angle coordinate of the lens surface, and is also the domain (independent) variable over which the above equation is defined (see FIG. 25);

n1 is the index of refraction of the lenses defined by the equation;

n2 is the index of refraction of the surrounding medium (e.g., of air) which usually equals 1 and phi2 is the polar angle variable for a predetermined specified output light intensity and is equal to the polar angle of an ideal ray (a ray emitted at the origin of the X-Z coordinate system) that was initially emitted at angle phi1 after the ray has left the surface of each lens defined by the equation (see FIG. 25) and is given by:

$$\frac{\int_{\phi 1\_MIN}^{\phi 1} rad\_in(\phi 1) \cdot 2\pi \cdot \sin(\phi 1) \, d\phi 1}{\int_{\phi 1\_MIN}^{\phi 1\_MAX} rad\_in(\phi 1) \cdot 2\pi \cdot \sin(\phi 1) \, d\phi 1} = $$

$$\frac{\int_{\phi 2\_MIN}^{\phi 2} rad\_out(\phi 2) \cdot 2\pi \cdot \sin(\phi 2) \, d\phi 2}{\int_{\phi 2\_MIN}^{\phi 2\_MAX} rad\_out(\phi 2) \cdot 2\pi \cdot \sin(\phi 2) \, d\phi 2}$$

EQU. 5 where, phi1_MIN and phi1_MAX are the lower and upper polar angle limits respectively of light collected by each lens defined by DE3;

phi2_MIN and phi2_MAX are the lower and upper polar angle limits respectively of a predetermined specified output light intensity distribution for each lens defined by the DE3;

rad_in(phi1) is the light intensity distribution (e.g., quasi-Lambertian) of the light source (e.g., LED) for which the lens is designed; and rad_out(phi2) is the predetermined specified output light intensity distribution for each lens defined by the equations; with initial conditions r1_ini for r1.

DE3 is integrated numerically and EQU. 5 is solved numerically for each input value of phi1 during the integration. The equation DE3 can be integrated in less than one-second on a PC computer.

One possible useful light distribution rad_out(phi2) is uniform. A primary lens that produces a uniform distribution (or at least more uniform than the quasi-Lambertian distribution) is used in the omnidirectional LED light bulb taught in applicants co-pending international application number PCT/US2009/000244 based on U.S. provisional patent application Ser. No. 61/011,180 filed Jan. 15, 2008.

In order to aim for a uniform distribution, it being understood that a perfectly uniform distribution will not be obtained, rad_out(phi2) is set equal to a constant, e.g., 1. Equation 4 implicitly defines phi2 as a function of phi1, i.e., phi2=f(phi1).

The table for the lens 2500 shown in FIG. 25 is:

TABLE VIII

| Phi1_MIN | 0.0 radians |
|---|---|
| Phi1_MAX | 1.57 radians (90 degrees) |
| Phi2_MIN | 0.0 radians |
| Phi2_MAX | 1.57 radians (90 degrees) |
| rad_in(phi1) | Plot 104 Quasi Lambertian |
| rad_out(phi2) | =1.0 (Uniform Intensity) |
| r1_ini | 3.0 |
| n1 | 1.497 |
| n2 | 1.0 |

Another possible useful light distribution is the above mentioned $\cos^{-3}(\phi)$ distribution. As indicated above this distribution will uniformly illuminate a flat surface that is set perpendicular to the optical axis (Z-axis). Possible applications of lenses that produce this distribution include wide angle task lights or downlights (e.g., low bay lighting) and back lighting Liquid Crystal Displays (LCDs). In backlighting applications, the invented lenses can be used with a collimating lens to collimate light that is distributed by the invented lenses. The associated collimating lens can include smooth portions, Fresnel portions and/or saw-tooth TIR portions.

Figure 26:
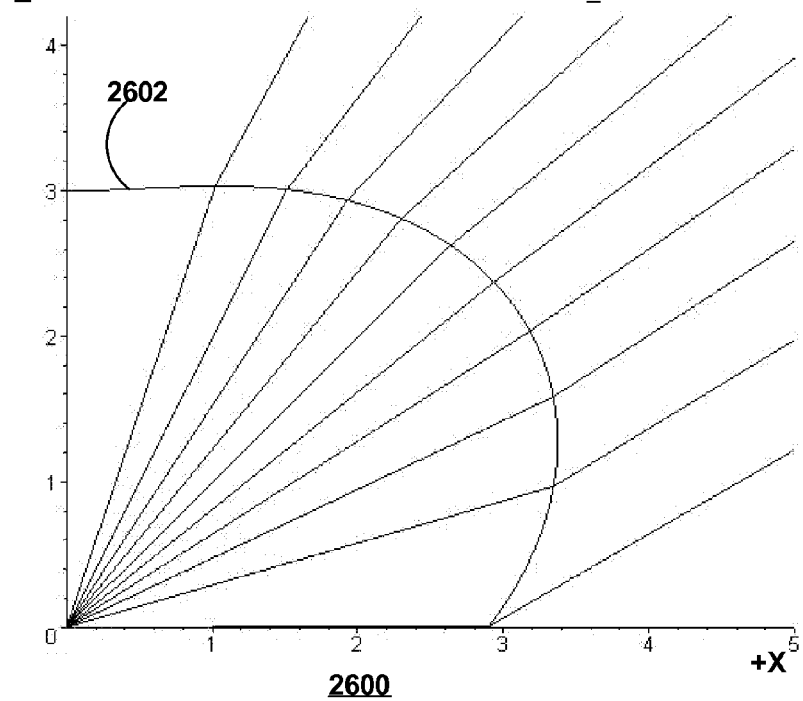

FIG. 26 is a plot of the generatrix 2602 of the surface of a primary lens 2600 according to another embodiment of the invention. The lens shown in FIG. 26 is designed to produce a light intensity distribution that approximates the $\cos^{-3}(\phi)$ over a range of 0 to 60 degrees. The table for the lens shown in FIG. 26 is:

TABLE IX

| Phi1_MIN | 0.0 radians |
|---|---|
| Phi1_MAX | 1.57 radians (90 degrees) |
| Phi2_MIN | 0.0 radians |
| Phi2_MAX | 1.047 radians (60 degrees) |
| rad_in(phi1) | Plot 104 Quasi Lambertian |
| rad_out(phi2) | =$\cos^{-3}(\Phi)$ |
| r1_ini | 3.0 |
| n1 | 1.497 |
| n2 | 1.0 |

Figure 27:
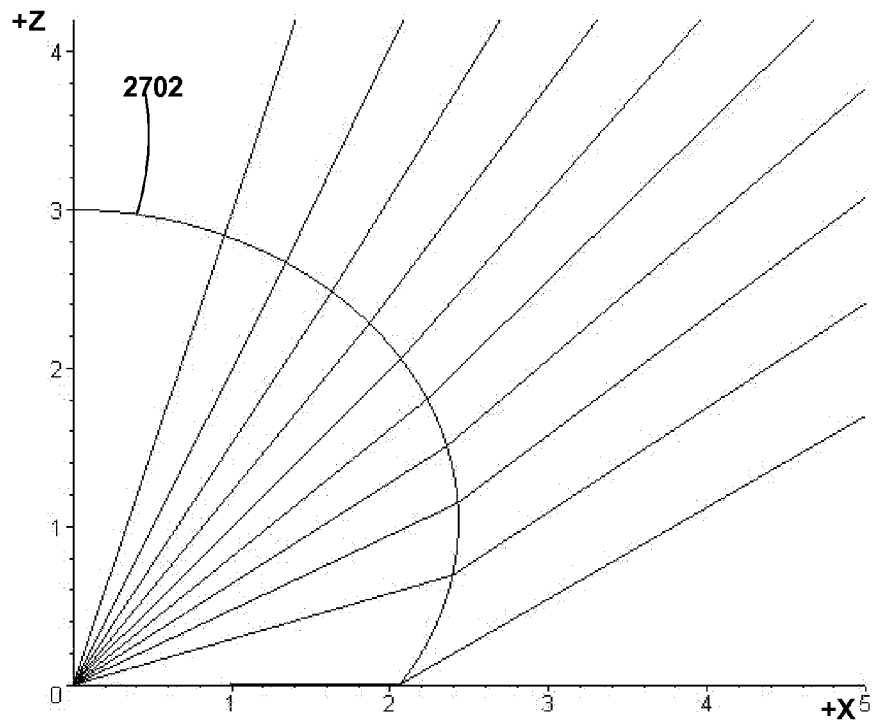
FIGS. 27-29 are graphs including the X-Z coordinate system and generatrices of refractive and reflective (TIR) primary lens for producing various light distributions narrower than produces by the lenses shown in FIGS. 25-26.

FIG. 27 Is a plot of the generatrix 2702 of the surface of a primary lens 2700 according to a third embodiment of the invention. The third lens is designed to distributed light uniformly within the polar angle range of 0.0 to 60.0 degrees. The table for the lens shown in FIG. 27 is:

TABLE X

| Phi1_MIN | 0.0 radians |
|---|---|
| Phi1_MAX | 1.57 radians (90 degrees) |
| Phi2_MIN | 0.0 radians |
| Phi2_MAX | 1.047 radians (60 degrees) |
| rad_in(phi1) | Plot 104 Quasi Lambertian |
| rad_out(phi2) | =1.0 (uniform goal) |

TABLE X-continued

| | |
|---|---|
| r1_ini(Phi1_MIN) | 3.0 |
| n1 | 1.497 |
| n2 | 1.0 |

Figure 28:
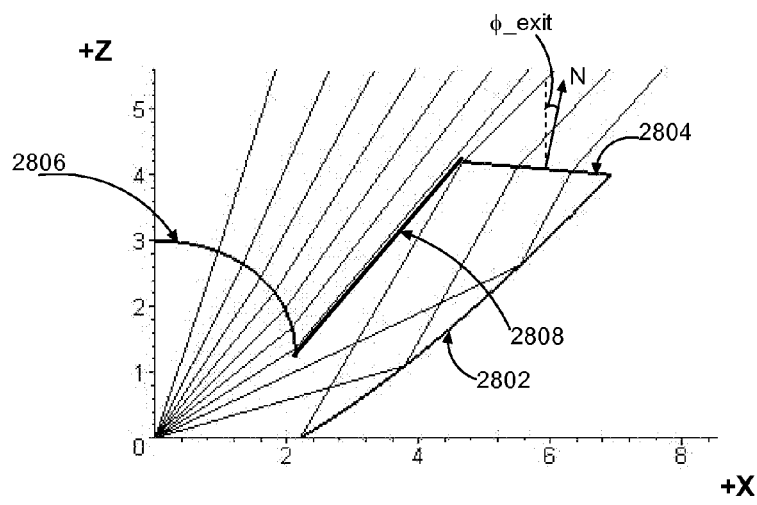

FIG. 28 shows generatrixes of surfaces 2802, 2804, 2806, 2808 of a lens 2800 with (TIR) wings according to a fourth embodiment of the invention. The TIR wings include a TIR reflecting surface 2802 which reflects light through an exit surface 2804. A central refracting surface 2806 is defined by DE3. The central refracting surface 2806 handles an angular range of light up to a polar angle value phi1_switch and the TIR reflecting surface 2802 handles light beyond phi1_switch. A wing inner surface 2808 merely connects the exit surface 2804 and the central refracting surface 2806. DE4 is given below

DE4

$$\frac{\partial}{\partial \phi 1} r1 = r1 \cot\left(-\frac{1}{2}\phi 1 - \frac{1}{2}\arcsin\left(\frac{n2\sin(-\phi 2 + \text{phi\_exit})}{n1}\right) + \frac{1}{2}\text{phi\_exit}\right)$$

where, phi1, r1, phi2 are the same as defined above; and
phi_exit is the angle between the upward facing surface normal 'N' to the exit surface 2804 and the Z-axis (measured in the clockwise direction, (see FIG. 28);
with initial condition r1_w_ini.
Table IV shows the inputs and radiant intensity functions for the lens 2800.

TABLE XI

| | |
|---|---|
| Phi1_MIN | 0.0 radians |
| Phi1_Switch | 1.047 radians (60 degrees) |
| Phi1_MAX | 1.57 radians (90 degrees) |
| Phi2_MIN | 0.0 radians |
| Phi2_MAX | 0.785 radians (45 degrees) |
| Phi_exit | 0.087 radians (5.0 degrees) |
| rad_in(phi1) | Plot 104 Quasi Lambertian |
| rad_out(phi2) | $=\cos^{-3}(\Phi)$ |
| r1_ini(Phi1_MIN) | 3.0 |
| r1_w_ini(Phi1_Switch) | 8.0 |
| n1 | 1.497 |
| n2 | 1.0 |

Figure 1:
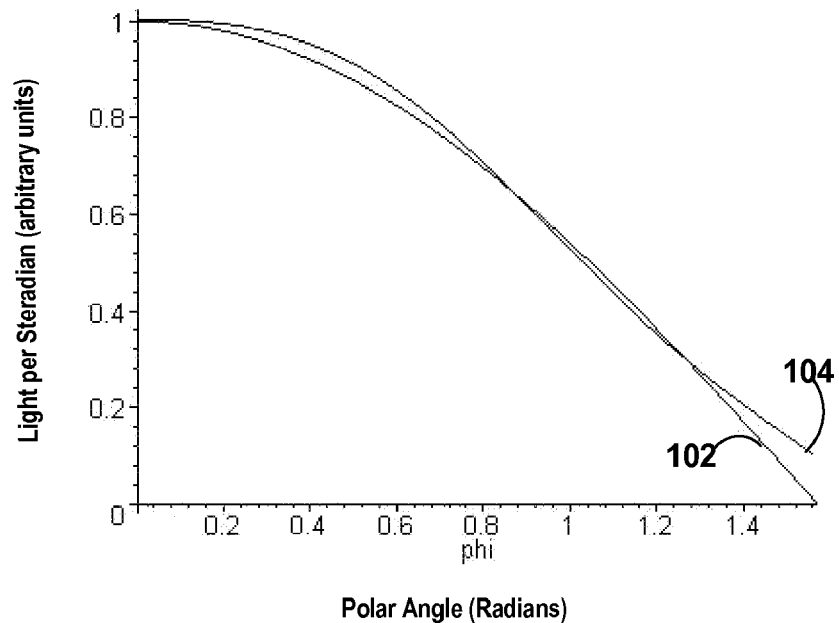
FIG. 1 is a graph including plots of light intensity versus polar angle for an ideal Lambertian (cosine) source, and a white LED with a hemispherical primary lens.
Figure 2:
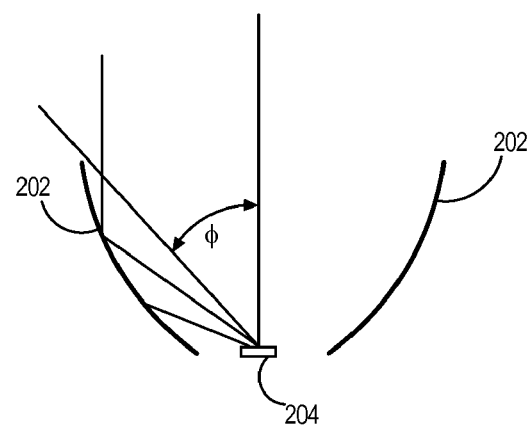
FIG. 2 is a schematic view of a reflector arranged to collect and reflect some light emitted by an LED.
Figure 3:
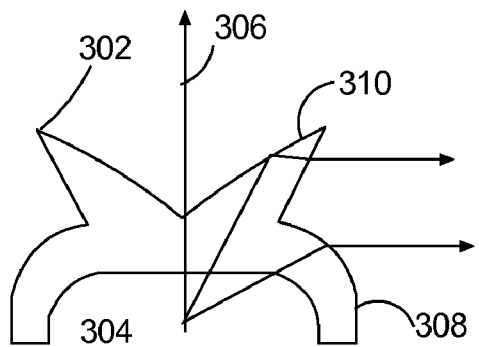
FIG. 3 is a primary optic for an LED.
Figure 4:
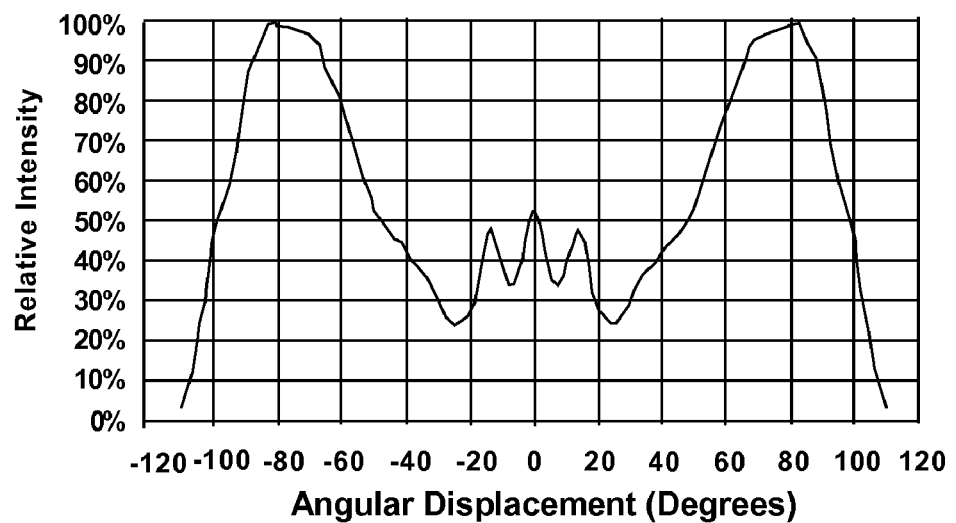
FIG. 4 plot of light intensity versus polar angle produced by the primary optic shown in FIG. 3.
Figure 5:
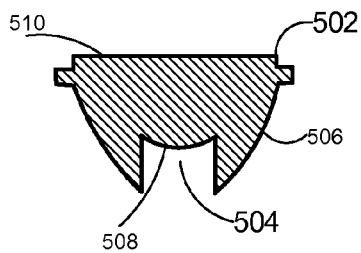
FIG. 5 is a secondary optic for an LED that produces a somewhat collimated light beam.
Figure 6:
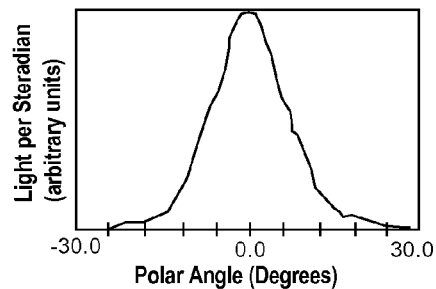
FIG. 6 is a plot of light intensity versus polar angle produced by the secondary optic shown in FIG. 5.
Figure 7:
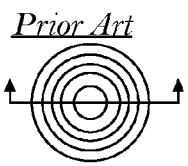
FIG. 7 is a top view of a pattern of ring convolutions that are added to a top surface of the secondary optic shown in FIG. 5 in order to obtain a broader angular distribution of light.
Figure 8:
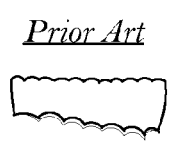
FIG. 8 is a broken out sectional view of the pattern of ring convolutions shown in FIG. 7.
Figure 9:
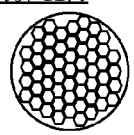
FIG. 9 is a top view of an array of lenslets that are added to the top surface of the secondary optic shown in FIG. 5 also in order to obtain a broader angular distribution of light.
Figure 10:
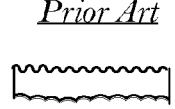
FIG. 10 is a broken out sectional view of the array of lenslets shown in FIG. 9.
Figure 11:
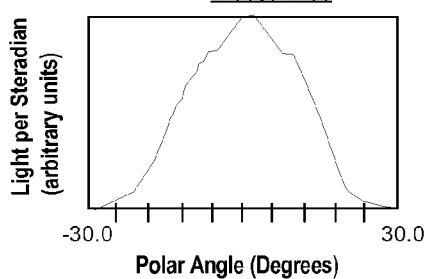
FIGS. 11-12 show broader light intensity versus polar angle distributions of light that are obtained by adding light diffusing features such as shown in FIGS. 7-10.
Figure 12:
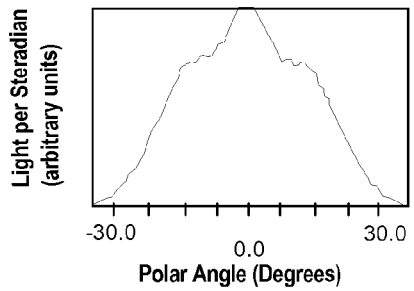
Figure 13:
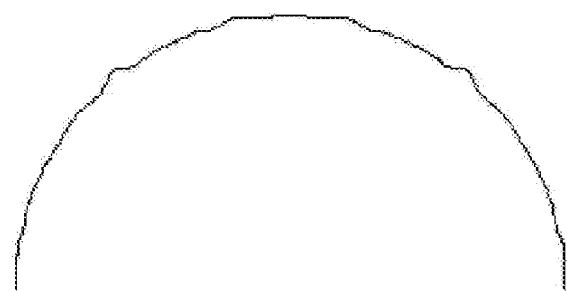
FIG. 13 is a prior art LED primary optic that is shaped as sphere with a spline perturbation.
Figure 14:
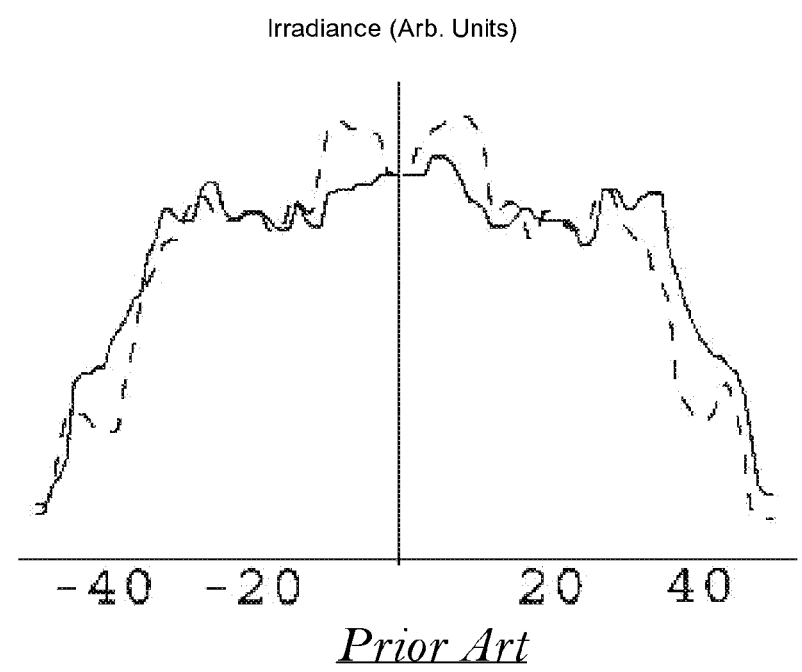
FIG. 14 is a plot of irradiance produced by the lens shown in FIG. 1.
Figure 15:
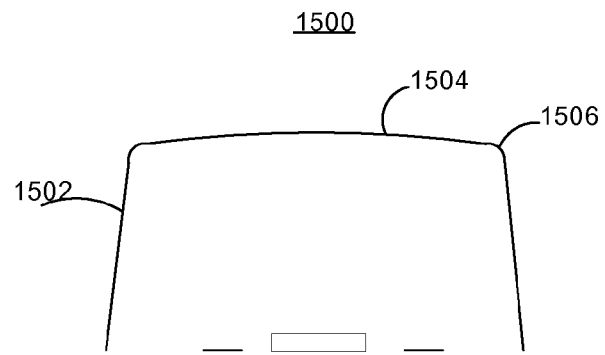
FIG. 15 is a prior art "batwing" LED primary optic.

The lens shown in FIG. 14 has a calculated transmittance of 95.8% and is suitable for flood lighting.

Figure 29:
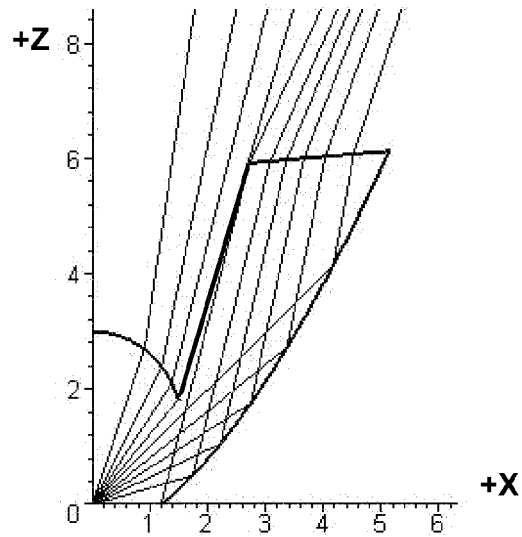

FIG. 29 shows generatrixes of surfaces of a lens 2900 with Total Internal Reflection (TIR) wings according to another embodiment of the invention. Table V shows inputs and radiant intensity functions for the lens 2900.

TABLE XII

| | |
|---|---|
| Phi1_MIN | 0.0 radians |
| Phi1_Switch | 1.047 radians (60 degrees) |
| Phi1_MAX | 1.57 radians (90 degrees) |
| Phi2_MIN | 0.0 radians |
| Phi2_MAX | 0.436 radians (25 degrees) |
| Phi_exit | 0.087 radians(−5.0 degrees) |
| rad_in(phi1) | Plot 104 Quasi Lambertian |
| rad_out(phi2) | $=\cos^{-3}(\Phi)$ |
| r1_ini(Phi1_MIN) | 3.0 |
| r1_w_ini(Phi1_Switch) | 8.0 |
| n1 | 1.497 |
| n2 | 1.0 |

The lens 2900 has a calculated transmittance of 95.4% and is suitable for use for a narrower flood light.

Phi_exit should be selected so that the angle of incidence of rays on the exit surface is small enough that the transmission of the exit surface is not significantly below the value for normal incidence. For many practical distribution such as $\cos^{-3}(\phi)$ one can assume that rays will exit the exit surface at approximately phi2_max. Typically a wide range of values of phi_exit will work. The value of Phi_exit also effects the extent of the exit surface, and in some case increasing the value of phi_exit can cause the radial coordinate of the TIR wing to come too close to the origin such that the mathematically calculated exit surface would interfere with, at least, the marginal ray emitted by the central lens defined by DE3. Whether this occurs is also affected by the relative values of other variables such as phi1_switch and r1_w_ini. Tracing a few design rays either by hand on a printout of the generatrixes or by using a computer ray trace program can help in evaluating choices of the variables listed in the tables and avoid any such interference.

Due to, at least, the finite size of LEDs and edge effects the lenses will not in general produce perfect fidelity to the output light distribution (rad_out) used in the equations. As discussed above in the case of output light distributions given by $\cos^{-x}(\phi)$ where $|x|>|3|$ one way to address this is to increase the magnitude of the exponent. The preceding case is an example of including a "multiplicative" correction to rad_out. Changing the exponent from 3 to some value x is equivalent to multiplying the light intensity distribution $\cos^{-3}(\phi)$ by a factor $\cos^{-x+3}(\phi)$.

Another way to improve fidelity is to measure the actual distribution produced by the lenses and make successive prototypes where rad_out in the above equation is adjusted by subtracting a function of phi2 that represents the error between the intended distribution rad_out and the actual measured data. Thus rad_out as it appears above, used to make an $N^{TH}$ prototype lens, would be replaced by:

$$\text{rad\_out}(\phi 2) - \sum_{i=1}^{N-1} \text{Error}_i(\phi 2) \qquad \text{EQU. 6}$$

where $\text{Error}_i$ is just the difference between rad_out and the measured distribution for an $i^{TH}$ prototype after both have been normalized to the same integrated power. For the first lens N=1, so the summation limit is zero, so there is no error correction. $\text{Error}_i$ (or the summation of $\text{Error}_i$) is conveniently represented as a cubic spline derived from measured light intensity data. In computing $\text{Error}_i$ measurements at positive and negative angles will be averaged together because rotational symmetry is assumed. I data taken at numerous azimuth angles is available such data can be averaged together for the same reason. The latter is an example of an "additive" correction. Substituting the expression given by equation 6 into equation 5 one obtains:

$$\frac{\int_{\phi 1\_MIN}^{\phi 1} \text{rad\_in}(\phi 1) \cdot 2\pi \cdot \sin(\phi 1) \, d\phi 1}{\int_{\phi 1\_MIN}^{\phi 1\_MAX} \text{rad\_in}(\phi 1) \cdot 2\pi \cdot \sin(\phi 1) \, d\phi 1} = \qquad \text{EQU. 7}$$

$$\frac{\int_{\phi 2\_MIN}^{\phi 2}\left(\text{rad\_out}(\phi 2) - \sum_{i=1}^{N-1} Error_i(\phi 2)\right) \cdot 2\pi \cdot \sin(\phi 2) d\phi 2}{\int_{\phi 2\_MIN}^{\phi 2\_MAX}\left(\text{rad\_out}(\phi 2) - \sum_{i=1}^{N-1} Error_i(\phi 2)\right) \cdot 2\pi \cdot \sin(\phi 2) d\phi 2}$$

One can use both types of correction, for example one or more corrected prototypes can be made using the multiplicative $\cos^{-x}(\phi)$ exponent correction, and one (or more) additional prototype can be made using the additive correction spline. The inventor has found in earlier work with secondary lenses that usually three to five prototypes are all that is necessary to achieve satisfactory fidelity to the intended pattern. The correction techniques can be applied when turning lenses on a lathe or when molding lenses. In the latter case the correction procedure may also be correcting systematic errors in the molding process which cause the lens shape to deviate from the intended design, not just errors due to the finite source size.

Figure 30:
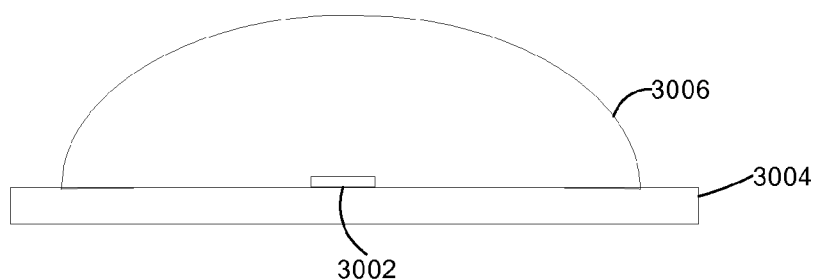
FIG. 30 shows a packaged LED including a lens according to the present invention.

FIG. 30 shows a packaged LED 3000 that includes a primary lens 3006 according to an embodiment of the invention. The packaged LED includes an LED die 3002 mounted on a substrate 3004 underneath the lens 3006 which is defined by DE3. Alternatively, a lens defined by DE3 and DE4 is used.

Figure 31:
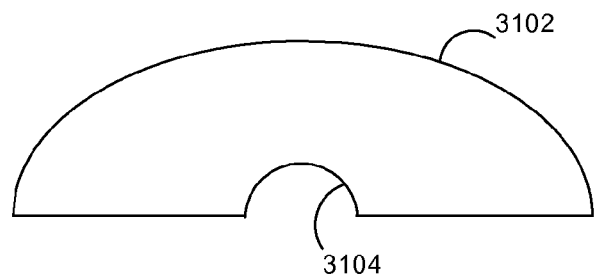
FIG. 31 shows a primary lens according to an embodiment of the invention.

FIG. 31 shows a lens 3100 with an outer surface 3102 defined by DE3 and a recess 3104 for receiving an LED die. The recess 3104 is suitably filled with a transparent compound (e.g., silicone) so that there is little or no reflection of light by the surface of the recess. Lenses with the recess can be molded ahead of time using injection molding and then fitted onto LED dies as part of packaged LED devices. According to certain embodiments, rather than integrated the primary lenses herein into a packaged LED, the lenses provided with the recess 3104 are fitted onto the hemispherical primary lenses of LEDs. This may be done at a bulb or luminaire factory rather than at the LED factory. A transparent material may or may not be used between the hemispherical primary lenses and the recess 3104. According to a further alternative the recess 3104 is hemispherical but with a radius larger than the radius of the hemispherical primary lens of an LED with which it is used, and in this case the lenses taught herein serve as secondary lenses. From an efficiency standpoint this latter alternative is not ideal because there will be added Fresnel reflection losses but may be acceptable for some applications.

Figure 32:
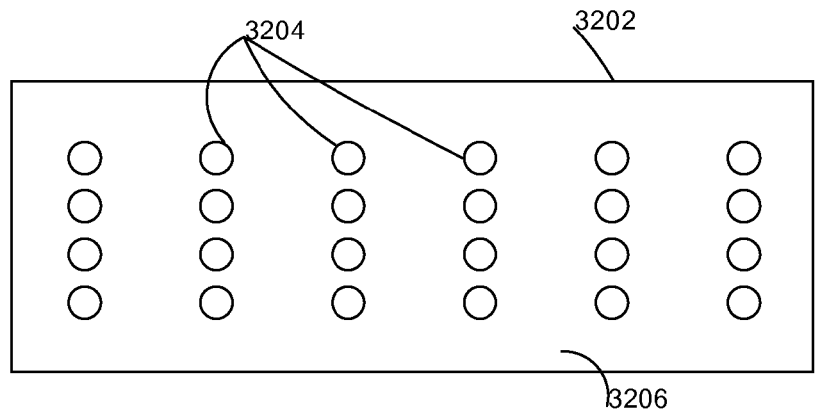
FIG. 32 is a plan view of an LED based fluorescent replacement fixture that includes an array of lenses according to an embodiment of the invention.

FIG. 32 is a plan view of an LED based fluorescent replacement fixture 3202 that includes an array of the lenses 3204 (lead lines for only three are shown to avoid crowding the figure) defined as described above. Each lens 3204 controls the light from a single LED chip or from a group of LED chips that are arranged close together, for example in a single LED package. The fixture 3202 also includes a power supply (not shown) for converting line power to power for the LEDs. The fixture 3202 may also include individual heat sinks (not shown) for each LED or LED package or a common heat sink. Heat sinks may be thermally coupled to a surface 2206 of the fixture in order to provide a larger area for dissipating heat.

Figure 33:
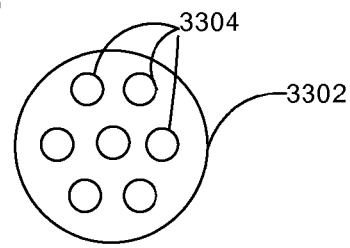
FIG. 33 is plan view of a round recessed lighting fixture that uses a several of the lenses according to an embodiment of the invention.

FIG. 33 is a plan view of a round (e.g., recessed, pendant, PAR replacement) lighting fixture 3302 that uses several of lenses 3304 defined as described above (only three of which are numbered to avoid crowding the figure). Note that the lenses 3304 may or may not be recessed above the ceiling level. Recessed lighting fixtures are typically made in six and four inch diameter sizes. As in the preceding cases the fixture 3302 will also include a power supply not shown and a heat sink (not shown). A low angle (e.g., 20°-30° FWHM) diffuser (not shown) may be positioned over the lenses 3304 to control glare.

Figure 34:
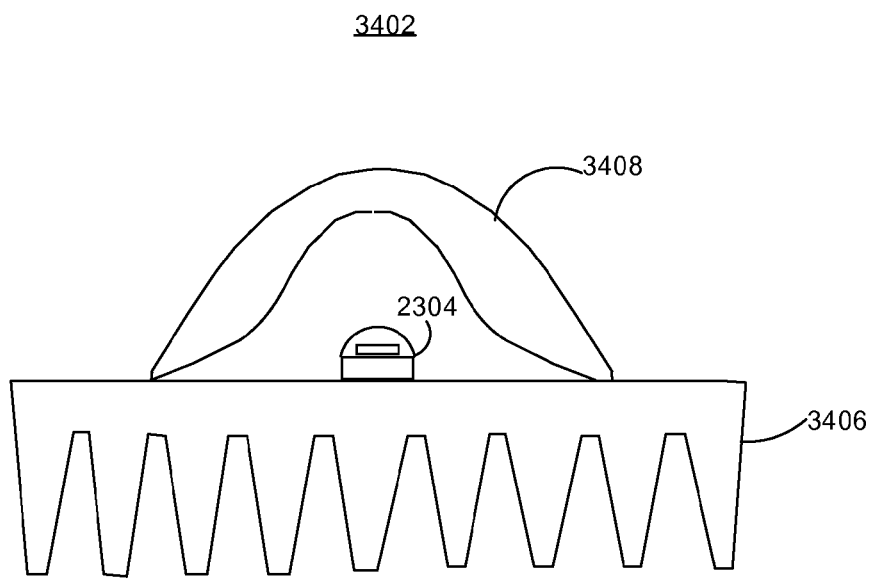
FIG. 34 shows a portion of an LED light engine according to an embodiment of the invention.

FIG. 34 shows an LED light engine 3402. The light engine 3402 includes a packaged LED 3404 mounted on a heat sink 3406. A secondary lens 3408 defined as described above is also mounted on the heat sink 3406. The lens 3408 is located around the LED 3404 with the LED located at the focal point (X-Z coordinate system origin) of the lens 3408. Alternatively, unpackaged LED chip could be used. Alternatively, a lens with TIR wings defined by DE2 could be used.

Figure 35:
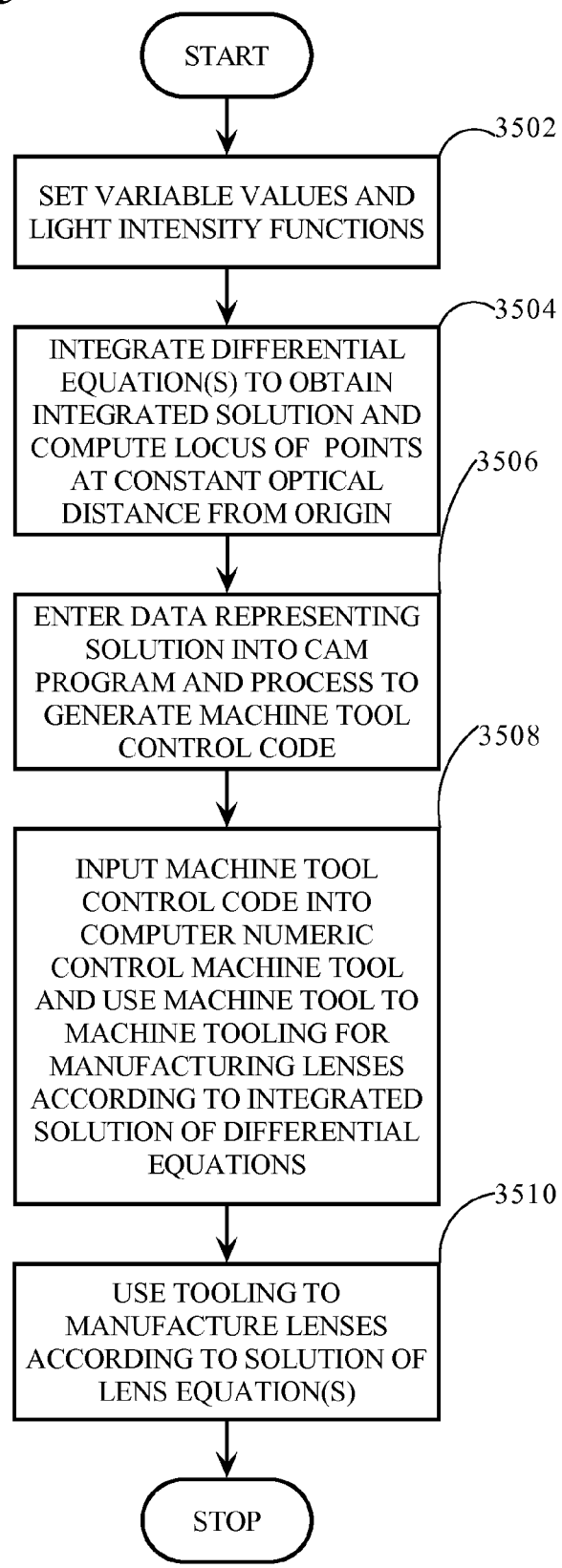
FIG. 35 is a flowchart of a method of making lenses according to embodiments of the invention.

FIG. 35 is a flowchart of a method 3500 of making lenses according to embodiments of the present invention. In block 3502 the values of the variables and functions, as are listed in the tables above, are entered into a computer that is loaded with a differential equation integrator such the Runge Kutta routine, for example. In block 3504 a chosen subset of the differential equations DE1, DE2, DE3, DE4 are integrated to obtain an integrated solution and possibly a locus of points of constant optical distance from the X-Z coordinate system origin are computed to define the second surface of the refractive lens surface (e.g. 1804). The integrated solution may be output as a series of points along each generatrix and optionally associated normal vectors for each point. Normal vectors based on phi2 can be output for the second surface (e.g., 1404).

In block 3506 data representing the integrated solution is input in a Computer Aided Manufacturing (CAM) program and processed to generate machine tool control code.

In block 3508 the machine tool control code is entered into a Computer Numeric Control (CNC) machine tool used to machine tooling (e.g., mold inserts) for manufacturing lenses according to the integrated solutions. Optionally the mold inserts will be polished (e.g., with a series of diamond pastes) before being used.

In block 3510 the tooling is used to manufacture lenses according to the integrated solutions.

Because the surfaces of the lens have smooth surfaces with few corners injection molding molds to make them can easily be turned and polished. Thus one can easily and relatively inexpensively make versions of the lens for each model of LED based on its light intensity distribution rad_in(phi1).

According to alternative embodiments rather than use surfaces defined by sweeping the generatrixes defined above through a full 360 degrees, the physical lenses are truncated. For example the physical lens can be truncated at the X-Z plane, and a mirror positioned at the X-Z plane. The mirror will form an image of the LED, reflect substantially all the light into a 180 degree azimuthal range and the lens 1506 will then redirect the light as described above but within a limited azimuthal range. This may be referred to as a "Demi-Lens". Alternatively a "quarter-lens" defined by sweeping the generatrices through 90 degrees may be used in conjunction with two mirrors i.e., one at the X-Z plane and another at the Y-Z plane. In this case the light will be confined to a 90 degree azimuthal range. Such lenses may be used in luminaires positioned near the walls and corners of a space in order to avoid uncontrolled illumination of the walls.

In addition to general illumination the lenses described herein can be used for backlighting LCD displays. In backlighting applications the lenses taught herein can be combined with a collimating lens to collimate light distributed by the lenses taught herein. The associated collimating lens can be use smooth portions, Fresnel portions and/or saw-tooth TIR portions.

Alternatively, a surface relief pattern can be added to one or more of the surfaces of the lens in order to provide a degree of diffusion, in this case the large scale profile of the lens surfaces is defined as related above, but there is a short scale, small amplitude variation added to the lens surface profiles. The small amplitude variation may be at a microscopic or near microscopic scale, e.g., a matt finish. Such a finish can be attained by appropriately finishing a mold surface.

Although the preferred and other embodiments of the invention have been illustrated and described, it will be apparent that the invention is not so limited. Numerous modifications, changes, variations, substitutions, and equivalents will occur to those of ordinary skill in the art without departing from the spirit and scope of the present invention as defined by the following claims.

What is claimed is:

1. An illumination lens comprising:
first surface and a second surface wherein at least a portion of the first surface has a shape described by a differential equation DE1 defined in a polar coordinate system:

DE1

$$\frac{\partial}{\partial \phi 1} r1(\phi 1) = -\frac{r1 \, n2 \sin(\phi 2 - \phi 1)}{n2 \cos(\phi 2 - \phi 1) - n1}.$$

where:
n2 is an index of refraction of the lens;
n1 is an index of refraction of a medium surrounding the lens;
r1 is a radial coordinate of the lens surface;
phi1 is a polar angular coordinate of the first surface;
phi2 is a polar angle of an ideal ray emitted at an origin of a coordinate system in which the differential equation DE1 is defined that was initially emitted at angle phi1 after the ideal ray passed through the second lens surface;
with an initial condition r1_ini.

2. The illumination lens according to claim 1 wherein phi2 is given by:

$$\frac{\int_{\phi 1\_MIN}^{\phi 1} rad\_in(\phi 1) \cdot 2\pi \cdot \sin(\phi 1) \, d\phi 1}{\int_{\phi 1\_MIN}^{\phi 1\_MAX} rad\_in(\phi 1) \cdot 2\pi \cdot \sin(\phi 1) \, d\phi 1} = \frac{\int_{\phi 2\_MIN}^{\phi 2} \left(rad\_out(\phi 2) - \sum_{i=1}^{N-1} Error_i(\phi 2)\right) \cdot 2\pi \cdot \sin(\phi 2) \, d\phi 2}{\int_{\phi 2\_MIN}^{\phi 2\_MAX} \left(rad\_out(\phi 2) - \sum_{i=1}^{N-1} Error_i(\phi 2)\right) \cdot 2\pi \cdot \sin(\phi 2) \, d\phi 2}$$

where,
phi1_MIN is a lower polar angle limit of light collected by the lens and phi1_MAX is an upper polar angle limit of light collected by the lens;
phi2_MIN is a lower angle limit of a predetermined specified output light intensity distribution function and phi2_MAX is an upper angle limit of the predetermined specified output light distribution function;
rad_in(phi1) is the light intensity distribution of a light source for which the lens is designed; and
rad_out(phi2) is the predetermined specified output light intensity distribution function;
$Error_i$(phi2) is a measured difference between rad_out (phi2) and an intensity distribution produced by an $i^{TH}$ prototype; and
N is a cardinal number identifying the lens in a sequence of prototype lenses.

3. The illumination lens according to claim 2 wherein for at least a sub-range of phi2_MIN to phi2_MAX:

$$rad\_out(\phi 2) = \frac{1}{(\cos(\phi 2))^e}.$$

4. The illumination lens according to claim 3 wherein e has a value in the range of 3.2 to 3.9.

5. The illumination lens according to claim 1 wherein the second lens surface is defined as a locus of points at constant optical distance from the origin, wherein the first surface is disposed between the origin and the second surface.

6. The illumination lens according to claim 1 further comprising a TIR Surface.

7. The illumination lens according to claim 1 further comprising a conical surface into which light enters the lens, an exit surface through which light exits the lens and a TIR surface that reflects light coming from the conical surface to the exit surface wherein said TIR surface is defined by:

$$phi2w = \frac{1}{2}\pi + phi\_draft - \arcsin\left(\frac{n1\cos(-\phi 1 + phi\_draft)}{n2}\right) -$$

$$\arcsin\left(r1\_switch(\tan(phi\_draft)\cos(phi1\_switch) - \sin(phi1\_switch))\right.$$

$$\cos\left(\phi 1 - phi\_draft + \arcsin\left(\frac{n1\cos(-\phi 1 + phi\_draft)}{n2}\right)\right) /$$

$$\left.((\tan(phi\_draft)\cos(\phi 1) - \sin(\phi 1))r2\_w(\phi 1))\right)$$

and

DE2

$$\frac{\partial}{\partial \phi 1} r2\_w = -r2\_w(\phi 1)\tan\left(\frac{1}{4}\pi - \frac{1}{2}phi\_draft + \frac{1}{2}\arcsin\left(\frac{n1\%2}{n2}\right) - \frac{1}{2}\arcsin\left(\frac{n1\sin(phi\_exit - \phi 3)}{n2}\right) + \frac{1}{2}phi\_exit + \arcsin\left(\frac{r1\_switch\,\%4\cos(\%3)}{\%1\,r2\_w(\phi 1)}\right)\right) - \frac{n1\sin(-\phi 1 + phi\_draft)}{n2\sqrt{1 - \frac{n1^2\%2^2}{n2^2}}} -$$

$$\left(-\frac{r1\_switch\,\%4\cos(\%3)(-\tan(phi\_draft)\sin(\phi 1) - \cos(\phi 1))}{(\%1^2 r2\_w(\phi 1))} - \right.$$

$$\left(\frac{r1\_switch\,\%4\sin(\%3)\left(1 + \frac{n1\sin(-\phi 1 + phi\_draft)}{n2\sqrt{1 - \frac{n1^2\%2^2}{n2^2}}}\right)}{\%1^2 r2\_w(\phi 1)}\right) /$$

$$\sqrt{1 - \frac{r1\_switch^2 \%4^2 \cos(\%3)^2}{\%1^2 r2\_w(\phi 1)^2}} /$$

$$\left(1 + \tan\left(\frac{1}{4}\pi - \frac{1}{2}phi\_draft + \frac{1}{2}\arcsin\left(\frac{n1\%2}{n2}\right) - \frac{1}{2}\arcsin\left(\frac{n1\sin(phi\_exit - \phi 3)}{n2}\right) + \frac{1}{2}phi\_exit + \arcsin\left(\frac{r1\_switch\,\%4\cos(\%3)}{\%1\,r2\_w(\phi 1)}\right)\right)r1\_switch\,\%4\cos(\%3) /$$

$$\left.\left(r2\_w(\phi 1)\,\%1\sqrt{1 - \frac{r1\_switch^2 \%4^2 \cos(\%3)^2}{\%1^2 r2\_w(\phi 1)^2}}\right)\right)$$

$\%1 := \tan(phi\_draft)\cos(\phi 1) - \sin(\phi 1)$ $\%2 := \cos(-\phi 1 + phi\_draft)$ $\%3 := \phi 1 - phi\_draft + \arcsin\left(\frac{n1\%2}{n2}\right)$ $\%4 := \tan(phi\_draft)\cos(phi1\_switch) - \sin(phi1\_switch)$ where,
phi3 is equal to phi2;
r2_w is a polar radial coordinate of the TIR surface;
phi2w is a polar angular coordinate of the TIR surface;
r1_switch is a polar radial coordinate of a top of the conical surface;
phi1_switch is a polar angular coordinate of the top of the conical surface;
phi_draft is an angle of the conical surface measured in the clockwise direction from a positive Z-axis of the coordinate system,
phi_exit is an angle of a surface normal of the exit surface measured in the clockwise direction from the positive Z-axis,
with initial condition r2_w_ini.

8. An illumination lens comprising a refracting surface having a generatrix described by a differential equation:

DE1

$$\frac{\partial}{\partial \phi 1} r1 = \frac{r1 n2 \sin(\phi 2 - \phi 1)}{-n2 \cos(\phi 2 - \phi 1) + n1}$$

where,
r1 is a radial coordinate of the refracting surface;
phi1 is a polar (zenith) angle coordinate of the refracting surface, and is also a domain variable over which the equation is defined
n1 is an index of refraction of the lens;
n2 is the index of refraction of a surrounding; and
phi2 is given by:

$$\frac{\int_{\phi 1\_MIN}^{\phi 1} \text{rad\_in}(\phi 1) \cdot 2\pi \cdot \sin(\phi 1) \, d\phi 1}{\int_{\phi 1\_MIN}^{\phi 1\_MAX} \text{rad\_in}(\phi 1) \cdot 2\pi \cdot \sin(\phi 1) \, d\phi 1} =$$

$$\frac{\int_{\phi 2\_MIN}^{\phi 2} \left(\text{rad\_out}(\phi 2) - \sum_{i=1}^{N-1} \text{Error}_i(\phi 2)\right) \cdot 2\pi \cdot \sin(\phi 2) \, d\phi 2}{\int_{\phi 2\_MIN}^{\phi 2\_MAX} \left(\text{rad\_out}(\phi 2) - \sum_{i=1}^{N-1} \text{Error}_i(\phi 2)\right) \cdot 2\pi \cdot \sin(\phi 2) \, d\phi 2}$$

where,
phi1_MIN is a lower polar angle limit of light collected by the lens;
phi1_MAX is an upper polar angle limit of light collected by the lens;
phi2_MIN is a lower polar angle limit of a predetermined specified output light intensity distribution;
phi2_MAX is an upper polar angle limit of the predetermined specified output light intensity distribution;
rad_in(phi1) is a light intensity distribution of a light source for which the lens is designed; and
rad_out(phi2) is the predetermined specified output light intensity distribution;
with initial condition r1_ini for r1;
Error$_i$(phi2) is a measured difference between rad_out (phi2) and an intensity distribution produced by an i$^{TH}$ prototype; and
N is a cardinal number identifying the lens in a sequence of prototype lenses.

9. The illumination lens according to claim 8 wherein:
rad_out(phi2) is equal to $\cos^{-x}(\phi 2)$.

10. An LED comprising the illumination lens recited in claim 8.

11. The illumination lens according to claim 8 further comprising an exit surface and a reflecting surface that reflects light through the exit surface wherein said reflecting surface has a generatrix described by:

DE2

$$\frac{\partial}{\partial \phi 1} r1 = r1 \cot\left(-\frac{1}{2}\phi 1 - \frac{1}{2}\arcsin\left(\frac{n2 \sin(-\phi 2 + \text{phi\_exit})}{n1}\right) + \frac{1}{2}\text{phi\_exit}\right)$$

where, phi_exit is a polar angle defining an orientation of a surface normal of the exit surface;
with initial condition r1_w_ini.

12. The illumination lens according to claim 11 wherein:
rad_out(phi2) is equal to $\cos^{-x}(\phi 2)$.

13. An LED comprising the illumination primary lens recited in claim 11.

14. The illumination lens according to claim 8 wherein:
rad_out(phi2) is equal to 1.0.

15. A method of making an illumination lens comprising:
setting variable values and light intensity functions of a differential equation:

DE1

$$\frac{\partial}{\partial \phi 1} r1 = \frac{r1 n2 \sin(\phi 2 - \phi 1)}{-n2 \cos(\phi 2 - \phi 1) + n1}$$

where,
r1 is a radial coordinate of a refracting surface;
phi1 is a polar (zenith) angle coordinate of the refracting surface, and is also a domain variable over which the equation is defined
n1 is an index of refraction of the lens;
n2 is the index of refraction of a surrounding; and
phi2 is given by:

$$\frac{\int_{\phi 1\_MIN}^{\phi 1} \text{rad\_in}(\phi 1) \cdot 2\pi \cdot \sin(\phi 1) \, d\phi 1}{\int_{\phi 1\_MIN}^{\phi 1\_MAX} \text{rad\_in}(\phi 1) \cdot 2\pi \cdot \sin(\phi 1) \, d\phi 1} =$$

$$\frac{\int_{\phi 2\_MIN}^{\phi 2} \text{rad\_out}(\phi 2) \cdot 2\pi \cdot \sin(\phi 2) \, d\phi 2}{\int_{\phi 2\_MIN}^{\phi 2\_MAX} \text{rad\_out}(\phi 2) \cdot 2\pi \cdot \sin(\phi 2) \, d\phi 2}$$

where,
phi1_MIN is a lower polar angle limit of light collected by the lens;
phi1_MAX is an upper polar angle limit of light collected by the lens;
phi2_MIN is a lower polar angle limit of a predetermined specified output light intensity distribution;
phi2_MAX is an upper polar angle limit of the predetermined specified output light intensity distribution;

rad_in(phi1) is a light intensity distribution of a light source for which the lens is designed; and rad_out(phi2) is the predetermined specified output light intensity distribution;

with initial condition r1_ini for r1;

$Error_i(phi2)$ is a measured difference between rad_out (phi2) and an intensity distribution produced by an $i^{TH}$ prototype; and N is a cardinal number identifying the lens in a sequence of prototype lenses;

integrating the differential equation to obtain an integrated solution;

manufacturing tooling according to the integrated solution;

using the tooling to manufacture the illumination lens.

* * * * *